US012369174B2

(12) United States Patent
Xue et al.

(10) Patent No.: US 12,369,174 B2
(45) Date of Patent: Jul. 22, 2025

(54) CONTINUOUS TRANSMISSION GRANTS IN SIDELINK COMMUNICATION NETWORKS

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 17/652,994

(22) Filed: Mar. 1, 2022

(65) Prior Publication Data

US 2023/0284203 A1    Sep. 7, 2023

(51) Int. Cl.
| | |
|---|---|
| *H04W 72/40* | (2023.01) |
| *H04W 72/02* | (2009.01) |
| *H04W 72/0446* | (2023.01) |
| *H04W 72/1263* | (2023.01) |
| *H04W 72/23* | (2023.01) |
| *H04W 92/18* | (2009.01) |

(52) U.S. Cl.
CPC ....... *H04W 72/40* (2023.01); *H04W 72/1263* (2013.01); *H04W 72/23* (2023.01);
(Continued)

(58) Field of Classification Search
CPC . H04W 72/1263; H04W 72/23; H04W 72/02; H04W 72/0446; H04W 72/40; H04W 72/53; H04W 72/20; H04W 72/042; H04W 72/14; H04W 72/25; H04W 72/0453; H04W 72/044; H04W 72/085; H04W 72/542; H04W 92/18; H04W 76/14; H04W 76/15; H04W 76/11; H04W 4/40; H04W 4/46; H04W 74/0833; H04W 74/0816; H04W 74/0866; H04W 88/023; H04W 88/08; H04W 84/005; H04W 52/52; H04W 56/00; H04W 24/08; H04W 24/10; H04W 48/12; H04L 1/1854; H04L 1/1896; H04L 1/1812; H04L 1/1887;
(Continued)

(56) References Cited

U.S. PATENT DOCUMENTS

| | | | |
|---|---|---|---|
| 2018/0049143 A1* | 2/2018 | Gupta | ................. H04W 16/14 |
| 2019/0110325 A1* | 4/2019 | Gulati | ............... H04W 72/0446 |

(Continued)

OTHER PUBLICATIONS

Intel Corporation: "Physical Structure for NR V2X", 3GPP Draft, 3GPP TSG RAN WG1 Meeting #98, R1-1908633, Aug. 26-30, 2019, pp. 1-24 (Year: 2019).*
(Continued)

*Primary Examiner* — Redentor Pasia
(74) *Attorney, Agent, or Firm* — Hayes & Boone LLP

(57) ABSTRACT

Wireless communications systems and methods related to communicating control information are provided. A method of wireless communication performed by a first sidelink user equipment (UE) may include receiving, from a base station (BS), an indicator associated with occupancy of a channel-access gap symbol and transmitting, to a second sidelink UE, a first physical sidelink shared channel (PSSCH) communication via the channel-access gap symbol based on the indicator associated with the occupancy of the channel-access gap symbol.

28 Claims, 11 Drawing Sheets

(52) U.S. Cl.
CPC ........ *H04W 72/02* (2013.01); *H04W 72/0446* (2013.01); *H04W 92/18* (2013.01)

(58) Field of Classification Search
CPC ... H04L 1/1819; H04L 1/1822; H04L 1/1893; H04L 1/1861; H04L 5/0055; H04L 5/0098; H04L 5/0044; H04L 5/0094; H04L 5/0051; H04L 5/0053; H04L 5/0007; H04L 5/003; H04L 5/0033; H04L 5/0048; H04L 5/0057; H04L 5/0026; H04L 27/2602; H04L 27/2607; H04L 27/2613; H04L 41/0806; H04L 25/0226; H04B 7/0626

See application file for complete search history.

(56) References Cited

U.S. PATENT DOCUMENTS

| | | | | |
|---|---|---|---|---|
| 2020/0029318 | A1* | 1/2020 | Guo | H04L 1/1822 |
| 2020/0187190 | A1* | 6/2020 | Gao | H04W 56/001 |
| 2020/0305127 | A1* | 9/2020 | Huang | H04W 72/0453 |
| 2020/0336253 | A1* | 10/2020 | He | H04W 76/11 |
| 2020/0351033 | A1* | 11/2020 | Ryu | H04L 1/1861 |
| 2021/0219268 | A1* | 7/2021 | Li | H04W 72/20 |
| 2021/0314933 | A1* | 10/2021 | Zhang | H04W 72/20 |
| 2021/0385804 | A1* | 12/2021 | Ye | H04L 5/0048 |
| 2022/0060944 | A1 | 2/2022 | Sun et al. | |
| 2022/0210804 | A1* | 6/2022 | Hwang | H04L 5/0053 |
| 2022/0417917 | A1* | 12/2022 | Fakoorian | H04W 4/023 |
| 2023/0047000 | A1* | 2/2023 | Guo | H04L 5/0037 |
| 2023/0064680 | A1* | 3/2023 | Huang | H04W 74/0816 |
| 2023/0087110 | A1* | 3/2023 | Hu | H04W 74/0808 370/329 |
| 2023/0148141 | A1* | 5/2023 | Hu | H04L 5/0053 370/329 |
| 2023/0403109 | A1* | 12/2023 | Dutta | H04L 1/1893 |
| 2024/0284515 | A1* | 8/2024 | Miao | H04W 74/0833 |

OTHER PUBLICATIONS

International Search Report and Written Opinion—PCT/US2023/012322—ISA/EPO—Jun. 6, 2023.

* cited by examiner

CONTINUOUS TRANSMISSION GRANTS IN SIDELINK COMMUNICATION NETWORKS

TECHNICAL FIELD

This application relates to wireless communication systems, and more particularly, to continuous transmission grants in sidelink communication networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include receiving, from a base station (BS), an indicator associated with occupancy of a channel-access gap symbol and transmitting, to a second sidelink UE, a first physical sidelink shared channel (PSSCH) communication via the channel-access gap symbol based on the indicator associated with the occupancy of the channel-access gap symbol.

In an additional aspect of the disclosure, a method of wireless communication performed by a first sidelink user equipment (UE) may include receiving, from a second sidelink UE, an indicator associated with occupancy of a channel-access gap symbol and receiving, from the second sidelink UE, a first physical sidelink shared channel (PSSCH) communication via the channel-access gap symbol based on the indicator associated with the occupancy of the channel-access gap symbol.

In an additional aspect of the disclosure, a first sidelink user equipment (UE) may include a memory, a transceiver, and at least one processor coupled to the memory and the transceiver, wherein the first sidelink UE is configured to receive, from a base station (BS), an indicator associated with occupancy of a channel-access gap symbol and transmit, to a second sidelink UE, a first physical sidelink shared channel (PSSCH) communication via the channel-access gap symbol based on the indicator associated with the occupancy of the channel-access gap symbol.

In an additional aspect of the disclosure, first sidelink user equipment (UE) may include a memory a transceiver and at least one processor coupled to the memory and the transceiver, wherein the first sidelink UE is configured to receive, from a second sidelink UE, an indicator associated with occupancy of a channel-access gap symbol and receive, from the second sidelink UE, a first physical sidelink shared channel (PSSCH) communication via the channel-access gap symbol based on the indicator associated with the occupancy of the channel-access gap symbol.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
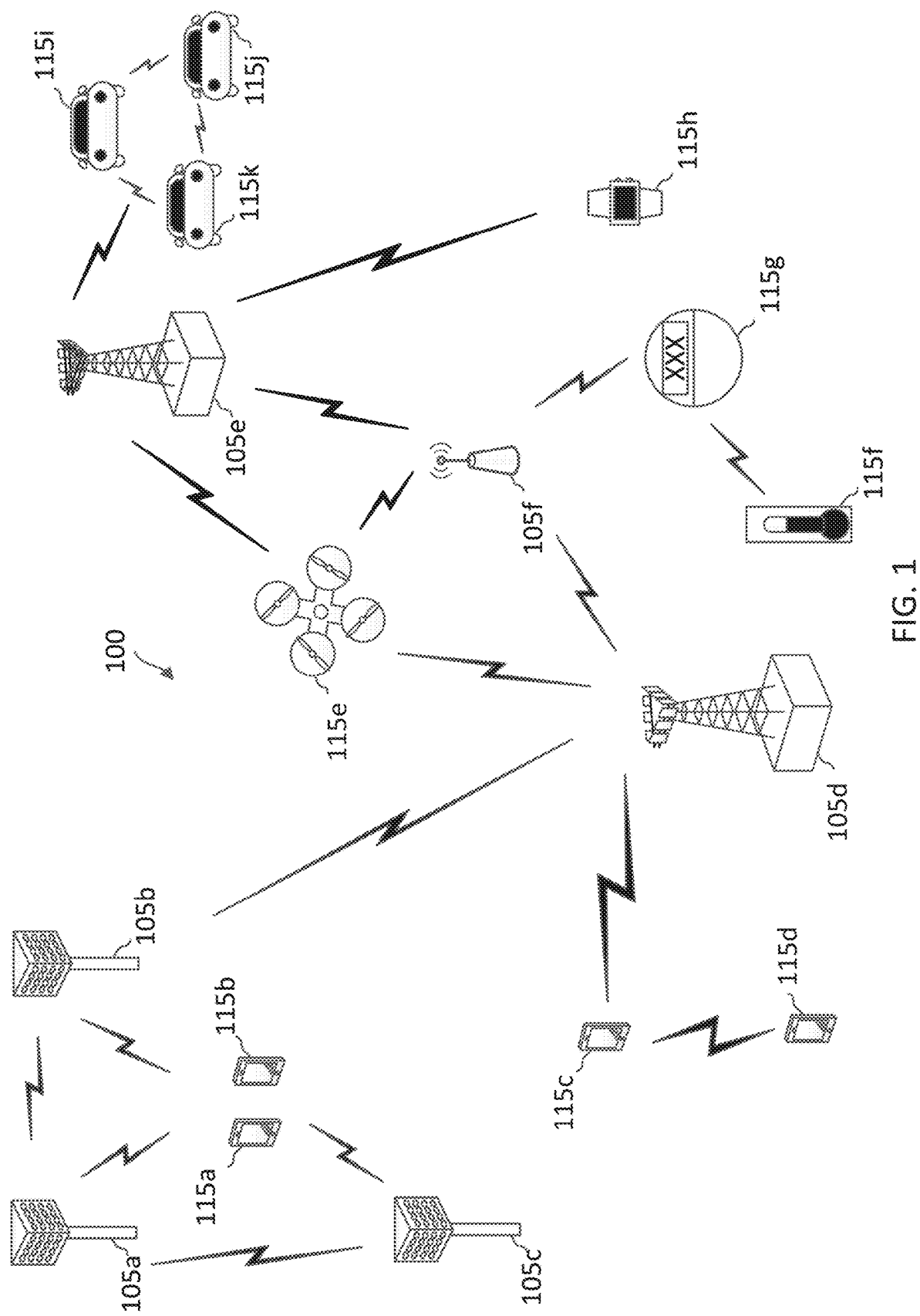
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about 70 percent (%).

Some sidelink systems may operate over a 20 MHz bandwidth in an unlicensed band. A BS may configure a sidelink resource pool over the 20 MHz band for sidelink communications. A sidelink resource pool is typically partitioned into multiple frequency subchannels or frequency subbands (e.g., about 5 MHz each) and a sidelink UE may select a sidelink resource (e.g., a subchannel) from the sidelink resource pool for sidelink communication. To satisfy an OCB of about 70%, a sidelink resource pool may utilize a frequency-interlaced structure. For instance, a frequency-interlaced-based sidelink resource pools may include a plurality of frequency interlaces over the 20 MHz band, where each frequency interlace may include a plurality of resource blocks (RBs) distributed over the 20 MHz band. For example, the plurality of RBs of a frequency interlace may be spaced apart from each other by one or more other RBs in the 20 MHz unlicensed band. A sidelink UE may select a sidelink resource in the form of frequency interlaces from the sidelink resource pool for sidelink communication. In other words, sidelink transmissions may utilize a frequency-interlaced waveform to satisfy an OCB of the unlicensed band. However, S-SSBs may be transmitted in a set of contiguous RBs, for example, in about eleven contiguous RBs. As such, S-SSB transmissions alone may not meet the OCB requirement of the unlicensed band. Accordingly, it may be desirable for a sidelink sync UE to multiplex an S-SSB transmission with one or more channel state information reference signals (CSI-RSs) in a slot configured for S-SSB transmission so that the sidelink sync UE's transmission in the slot may comply with an OCB requirement.

The present application describes mechanisms for a sidelink UE to multiplex an S-SSB transmission with a CSI-RS transmission in a frequency band to satisfy an OCB of the frequency band. For instance, the sidelink UE may determine a multiplex configuration for multiplexing a CSI-RS transmission with an S-SSB transmission in a sidelink BWP. The sidelink UE may transmit the S-SSB transmission in the sidelink BWP during a sidelink slot. The sidelink UE may transmit one or more CSI-RSs in the sidelink BWP during the sidelink slot by multiplexing the CSI-RS and the S-SSB transmission based on the multiplex configuration.

In some aspects, the sidelink UE may transmit the S-SSB transmission at an offset from a lowest frequency of the sidelink BWP based on a synchronization raster (e.g., an NR-U sync raster). In some aspects, the sidelink UE may transmit the S-SSB transmission aligned to a lowest frequency of the sidelink MVP. For instance, a sync raster can be defined for sidelink such that the S-SSB transmission may be aligned to a lowest frequency of the sidelink BWP.

In some aspects, the multiplex configuration includes a configuration for multiplexing the S-SSB transmission with a frequency interlaced waveform sidelink transmission to meet the OCB requirement. For instance, the sidelink transmission may include a CSI-RS transmission multiplexed in frequency within a frequency interlace with RBs spaced apart in the sidelink BWP. In some instances, the sidelink UE may rate-match the CSI-RS transmission around RBs that are at least partially overlapping with the S-SSB transmission.

In some aspects, the multiplex configuration includes a configuration for multiplexing the S-SSB transmission with a subchannel-based sidelink transmission to meet the OCB requirement. For instance, the sidelink transmission may include a CSI-RS transmission multiplexed in time within a subchannel including contiguous RBs in the sidelink BWP. For instance, the S-SSB transmission may be transmitted at a low frequency portion of the sidelink BWP, and the CSI-RS may be transmitted in a subchannel located at a high frequency portion of the sidelink BWP to meet the OCB.

In some aspects, a BS may configure different sidelink resource pools for slots that are associated with S-SSB transmissions and for slots that are not associated with S-SSB transmissions. For instance, the BS may configure a first resource pool with a frequency-interlaced structure for slots that are not configured for S-SSB transmissions. The first resource pool may include a plurality of frequency interlaces e.g., distributed RBs), where each frequency interlace may carry a PSCCH/PSSCH transmission. The BS may configure a second resource pool with a subchannel-based structure for slots that are configured for S-SSB transmission. The second resource pool may include a plurality of frequency subchannels (e.g., contiguous RBs), where each subchannel may carry a PSCCH/PSSCH transmission. To satisfy an OCB in a sidelink slot configured for an S-SSB transmission, the sidelink UE (e.g., a sidelink sync UE) may transmit an S-SSB transmission multiplexed with a CSI-RS transmission. For instance, the S-SSB transmission may be transmitted in frequency resources located at a lower frequency portion of a sidelink BWP and the CSI-RS transmission may be transmitted in frequency resources located at higher frequency portion of the sidelink BWP.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (COMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UL 115 to a BS 105, The communication can be in the form of radio frames, A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band.

In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115*c* may receive an indicator from the BS 105*d* associated with occupancy of a channel-access gap symbol. The UE 115*d* may transmit a first physical sidelink shared channel (PSSCH) communication to the UE 115*d* via the channel-access gap symbol based on the indicator associated with the occupancy of the channel-access gap symbol.

Figure 2A:
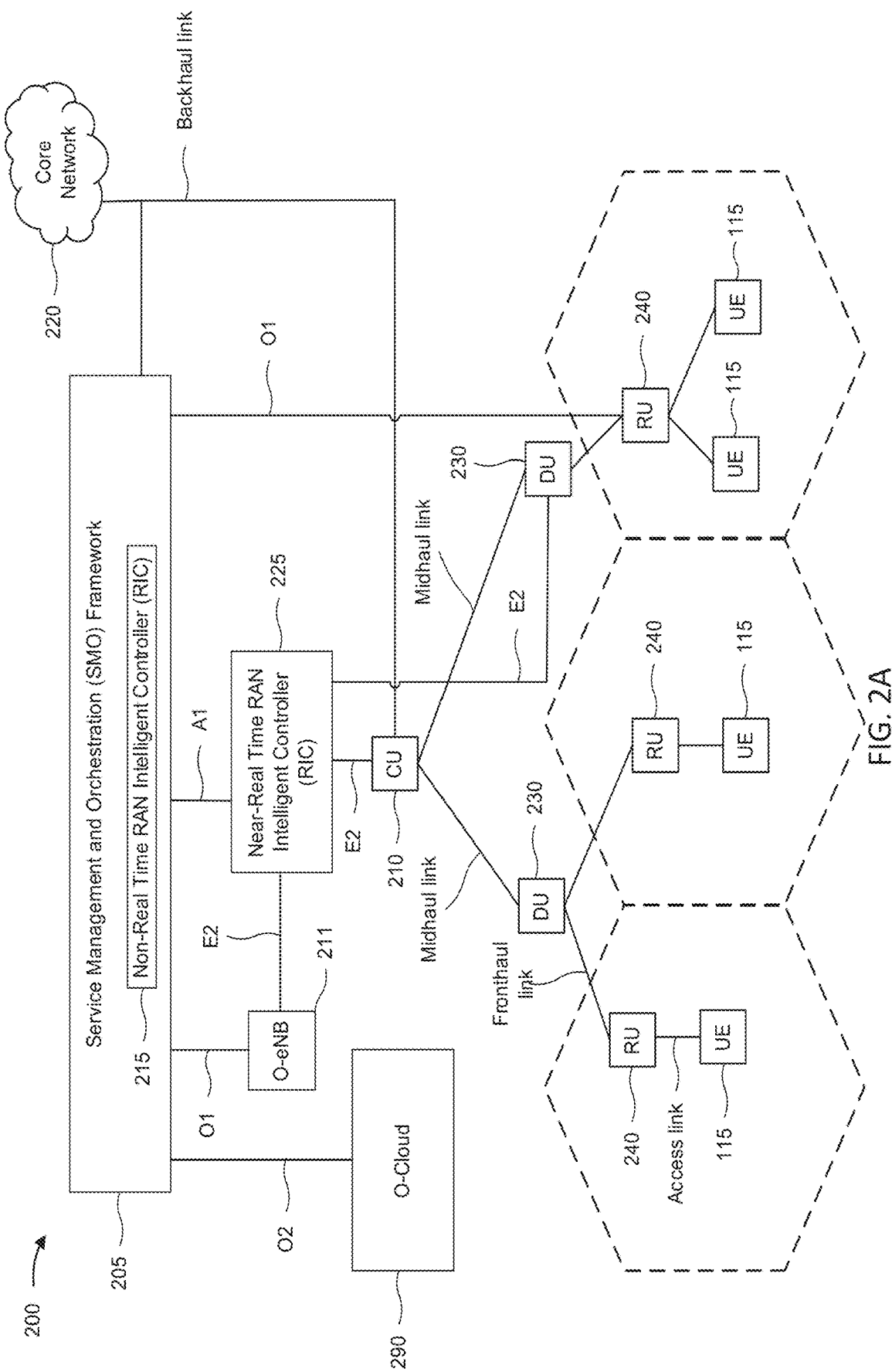
FIG. 2A illustrates an example disaggregated base station architecture according to some aspects of the present disclosure

FIG. 2A shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PRY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RE processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT MC 215 configured to support functionality of the SMO Framework 205.

The Non-RT MC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT MC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AWL models to perform corrective actions through the SMO Framework 205 (such as reconfiguration via O1) or via creation of RAN management policies (such as A1 policies).

In some aspects, a first UE 115 may receive an indicator from the RU 240 associated with occupancy of a channel-access gap symbol. The first UE 115 may transmit a first physical sidelink shared channel (PSSCH) communication to a second UE 115 via the channel-access gap symbol based on the indicator associated with the occupancy of the channel-access gap symbol.

Figure 2B:
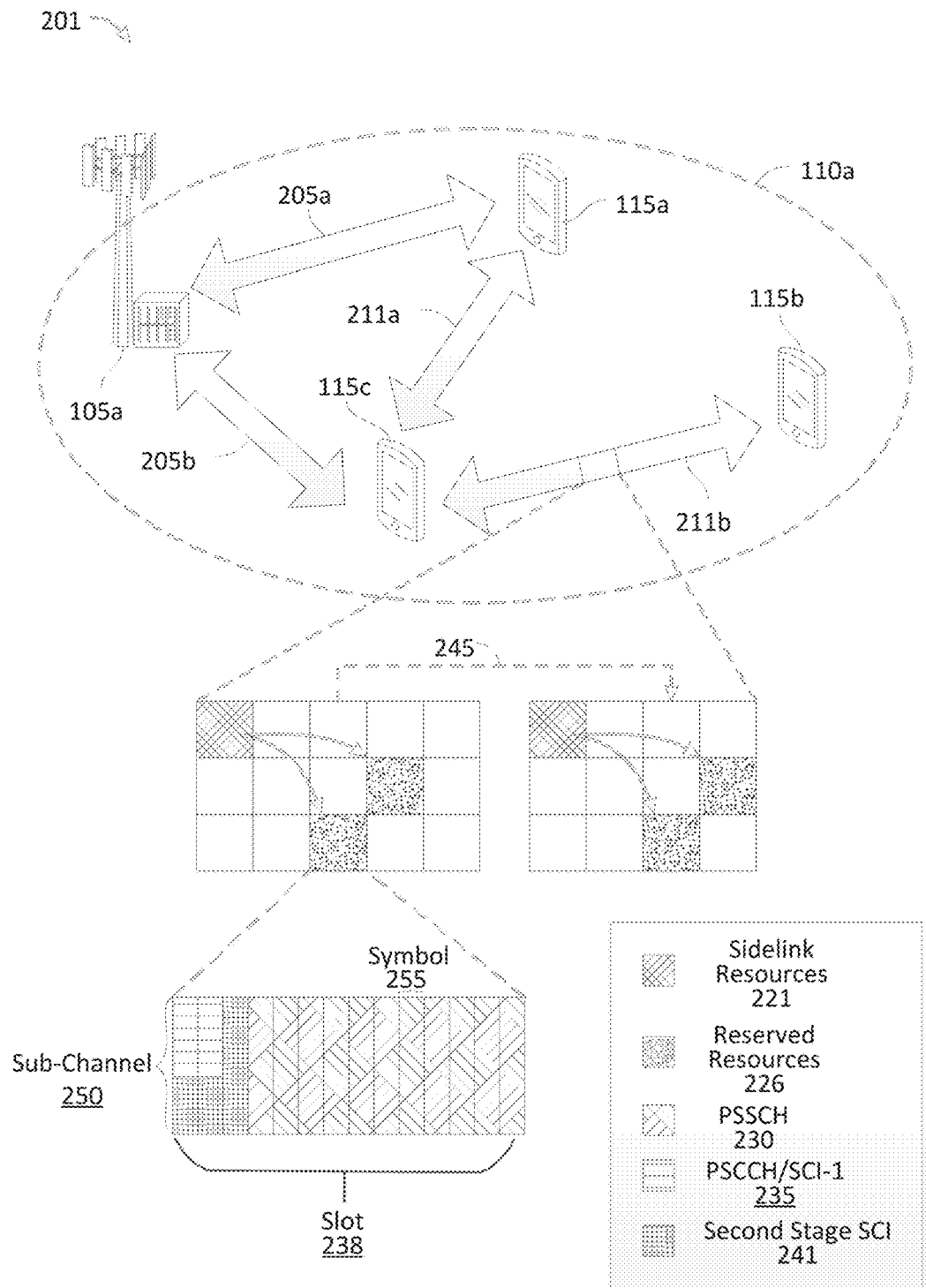
FIG. 2B illustrates a sidelink wireless communication network according to some aspects of the present disclosure.

FIG. 2B illustrates sidelink resources associated with a wireless communication network 201 according to some aspects of the present disclosure. The wireless communications network 201 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 211a and 211b, respectively. In some examples, UE 115c may transmit SCI to UEs 115a and 115b via the sidelink control resources 221. The SCI may include an indication of resources reserved for retransmissions by UE 115c (e.g., the reserved resources 226). In some examples, UEs 115a and 115b may determine to reuse one or more of the reserved resources 226.

In some aspects, a device in the wireless communication network 201 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 211. The PSCCH/first stage SCI-1 235 may indicate resources that are reserved by UE 115c for retransmissions (e.g., the SCI-1 may indicate the reserved resources 226 for retransmissions). Each sidelink UE 115 may decode the first stage SCI-1 to determine where the reserved resources 226 are located (e.g., to refrain from using resources that are reserved for another sidelink transmission and/or to reduce resource collision within the wireless communications network 201). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 221. The sidelink control resources 221 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 226. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 226), a modulation and coding scheme (MCS) for a second stage SCI-2 241, a beta offset value for the second stage SCI-2 241, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 241. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 226 (e.g., a receiving UE 115 may determine a location of the reserved resources 226 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 226. In this regard, the first stage SCI-1 may indicate the reserved resources 226 to the one or more sidelink UEs 115 in the wireless communication network 200.

In some aspects, the BS 105 may configure a sidelink UE 115 as a sidelink sync UE (e.g., the UE 115c). When operating as a sidelink sync UE, the UE 115 may broadcast S-SSBs which may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots 238 configured for S-SSB transmission and/or S-SSB transmission periodicity), and/or any other configuration information related to sidelink communications as will be discussed more fully below. Accordingly, other UEs (e.g., the UEs 115d and 115e) that are nearby the UE 115c, but may be out of the coverage of the BS 105 may listen to and synchronize to the S-SSBs and communicate with each other based on the S-SSBs.

In some aspects, the UE 115c may receive an indicator from the BS 105a associated with occupancy of a channel-access gap symbol. The UE 115c may transmit a first physical sidelink shared channel (PSSCH) communication to the UE 115c via the channel-access gap symbol based on the indicator associated with the occupancy of the channel-access gap symbol.

Figure 3:
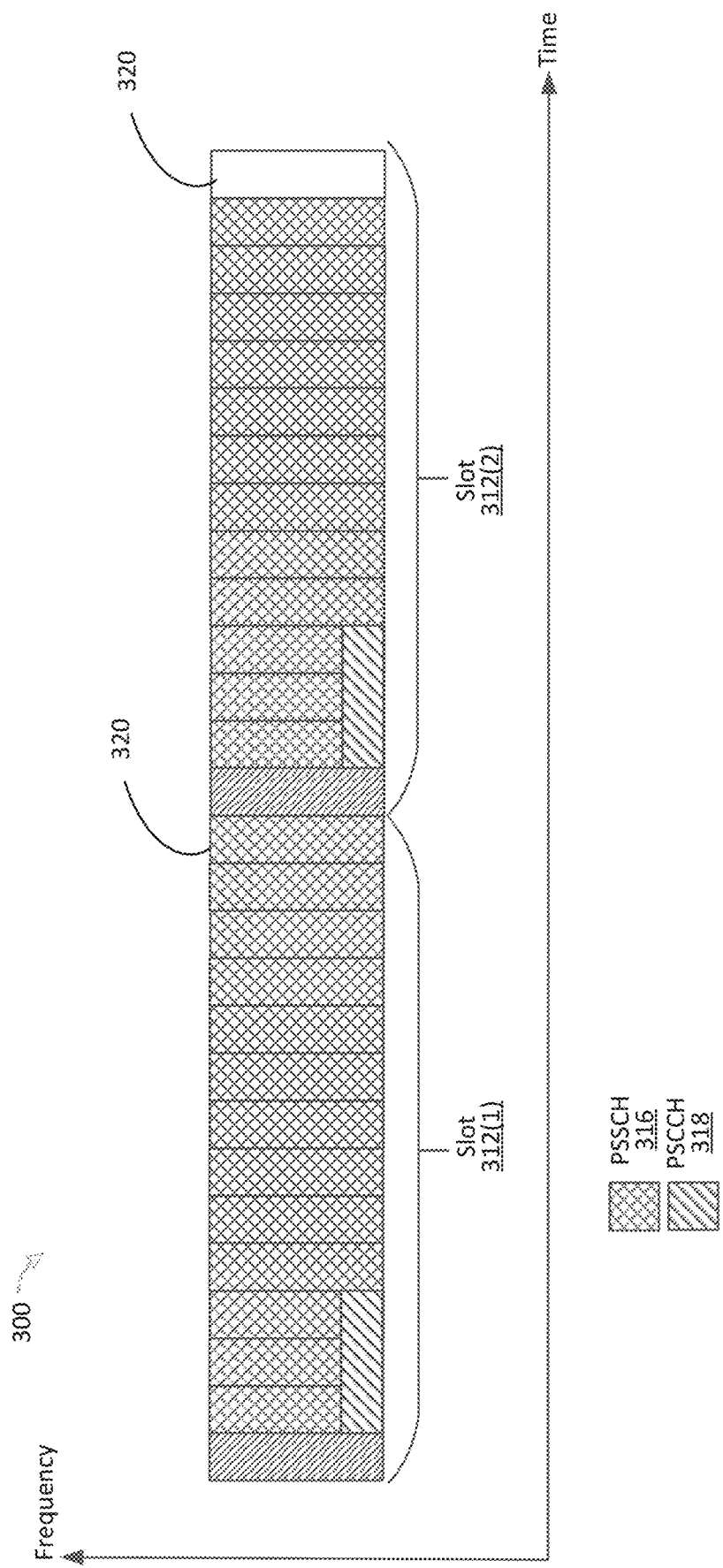
FIG. 3 illustrates resources associated with continuous transmissions according to some aspects of the present disclosure.

FIG. 3 illustrates resources 300 associated with continuous transmissions according to some aspects of the present disclosure. In FIG. 3, the x-axis represents time in some arbitrary units and the y-axis represents frequency in some arbitrary units. In some aspects, a first sidelink UE (e.g., the UE 115 or the UE 700) may receive an indicator from a base station (BS) (e.g., the BS 105 or 800) associated with an occupancy of a channel-access gap symbol 320. In this regard, the first sidelink UE may receive the indicator from the BS via a PDCCH, a PDSCH, DCI, an RRC message, a MAC-CE message, or other suitable communication. In some aspects, a last OFDM symbol in each slot may be reserved as a gap to facilitate transmit/receive switching in a next slot. In some aspects, deployment of NR may involve utilizing a similar structure of a gap in the last OFDM symbol of each slot as a common silence interval for the LBTs described above used to contend for channel occupancy time (COT) in a shared channel. For instance, a transmitting node may perform an LBT within such a gap (e.g., the common silence interval) preceding a slot to gain access to a shared channel for transmission over the slot. In that regard, as described herein, a "channel-access gap" may refer to a portion of a slot, such as the last OFDM symbol of the slot which may be used to access the channel. The channel-access gap may also be referred to as a "between-slot medium," as the channel-access gap may be positioned between the end of a portion of a first slot designated for data communication (e.g., transmission and/or reception) and a start of a following, second slot. The term "channel-access gap symbol" may be used interchangeably with the term "gap symbol."

In some aspects, the first sidelink UE may receive the indicator from the BS as a code point. The first sidelink UE may receive the code point via downlink control information (DCI) (e.g., a DCI-3.0 message) or other suitable communication. A code point may be a numerical value (e.g., a binary encoded value) of any length representing information (e.g., the indicator associated with occupancy of the channel-access symbol). The code point may be a sequence of numbers and/or bits encoded to represent the indicator associated with occupancy of the channel-access symbol. In some aspects, a code point may be a sequences of code points that encode other code points. In some instances, the code point may be a single bit (e.g., 0 or 1) indicating whether the first sidelink UE may occupy (e.g., transmit in) the gap symbol. For example, the first sidelink UE may receive a code point "1" to indicate the first sidelink UE may transmit in the gap symbol 320 or a code point "0" to indicate the first sidelink UE may not transmit in the gap symbol 320. In some aspects, the first sidelink UE may receive the indicator as a sequence of code points. In this regard, the indicator may be represented as a contiguous sequence of binary numbers.

When the indicator received by the first sidelink UE indicates the first sidelink UE may transmit in the gap symbol 320, the BS may block LBT attempts by other sidelink UEs to enable the first sidelink UE to transmit in the gap symbol 320. The first sidelink UE may transmit a first PSSCH 316 communication in the gap symbol 320 of slot 312(1) and transmit a second PSSCH 316 communication in slot 312(2) contiguous with the gap symbol 320.

In some aspects, the indicator associated with the occupancy of the channel-access gap symbol 320 may be based on a channel access priority class (CAPC) associated with a second PSSCH 316 communication. The first sidelink UE may intend to transmit a first PSSCH 316 communication in a gap symbol 320 of slot 312(1) and transmit the second PSSCH 316 communication in slot 312(2) contiguous with the gap symbol 320. The indicator associated with the gap symbol 320 may indicate the first sidelink UE is allowed to transmit in the gap symbol 320 when the CAPC value (e.g., CAPC value of 1, 2, 3, 4, or more) associated with the second PSSCH 316 communication satisfies a threshold. Conversely, the indicator associated with the gap symbol 320 may indicate the first sidelink UE is not allowed to transmit in the gap symbol 320 when the CAPC value associated with the second PSSCH 316 communication does not satisfy a threshold. The threshold may include a single CAPC value and/or a range of CAPC values. For example, in some instances the threshold is satisfied when the CAPC value associated with the second PSSCH 316 communication is less than the single CAPC value, less than or equal to the single CAPC value, and/or included in the range of CAPC values. In some instances, the threshold is not satisfied when the CAPC value associated with the second PSSCH 316 communication is greater than the single CAPC value, greater than or equal to the single CAPC value, and/or not included in the range of CAPC values.

The first sidelink UE may receive the threshold value(s) and/or the CAPC value associated with the second PSSCH 316 communication from the BS (e.g.; the BS 105 or 800) via a PDCCH, a PDSCH, DCI, an RRC message, a MAC-CE message, or other suitable communication. In some aspects, the first sidelink UE may receive the threshold and/or the CAPC value associated with the second PSSCH 316 communication from the BS via downlink control information (DCI) (e.g., a DCI-3.0 message). Additionally or alternatively, the first sidelink UE may determine the CAPC of the second PSSCH 316 communication based on a priority level associated with a TB to be transmitted in the second PSSCH 316 communication.

In some aspects, the first sidelink UE (e.g., the UE 115 or the UE 700) may transmit a first PSSCH 316 communication to a second sidelink UE via the channel-access gap symbol 320 based on the indicator associated with the occupancy of the channel-access gap symbol 320. By utilizing the channel-access gap symbol 320 to transmit the first PSSCH 316 communication, the first sidelink UE may increase the communications capacity of the wireless network (e.g., the wireless network 100, 200, or 201) and/or increase the communications capacity between the first and second sidelink UEs. In some aspects, the first PSSCH 316 communication and/or the second PSSCH 316 communication may carry one or more transport blocks (TBs).

In some aspects, the first sidelink UE may transmit the indicator associated with occupancy of the channel-access gap symbol 320 to the second sidelink UE. The indicator may be the same indicator received by the first sidelink UE from the BS (e.g., a code point) or the indicator may be different from the indicator received by the first sidelink UE from the BS. For example, the indicator may be a TDRA transmitted in SCI to the second sidelink UE indicating resources in the gap symbol 320 for the first sidelink UE to transmit a PSSCH 316 communication. The first sidelink UE may transmit the indicator to the second sidelink UE as a code point in SCI (e.g., SCI-1 via PSCCH 318 and/or SCI-2 via PSSCH 316). The code point may be a single bit (e.g., 0 or 1) indicating whether the first sidelink UE may occupy (e.g., transmit in) the gap symbol 320. For example, the first sidelink UE may transmit a code point "1" in SCI to indicate the first sidelink UE may transmit to the second sidelink UE in the gap symbol 320 or a code point "0" in SCI to indicate the first sidelink UE may not transmit to the second sidelink UE in the gap symbol 320. In some aspects, the first sidelink UE may transmit an indicator to the second sidelink UE indicating whether the first sidelink UE may occupy (e.g., transmit in) the gap symbol 320 of a plurality of slots 312 and/or a sequence (e.g., contiguous sequence) of slots 312 (e.g., slots 312(1) and 312(2)). In this regard, the first sidelink UE may transmit an indicator indicating the number of slots 312 the first sidelink UE may occupy the gap symbol 320 and/or the indexes associated with the slots 312 in which the first sidelink UE may occupy the gap symbol 320.

In some aspects, the first sidelink UE may transmit a second PSSCH 316 communication to the second sidelink UE in slot 312(2) contiguous with the channel-access gap symbol 320 based on the indicator associated with the occupancy of the channel-access gap symbol 320. In this regard, the first sidelink UE may transmit the first PSSCH 316 in the gap symbol 320 (e.g., symbol index 13) of slot 312(1) and transmit the second PSSCH 316 in slot 312(2) that is contiguous with the gap symbol 320 of slot 312(1).

Figure 4:
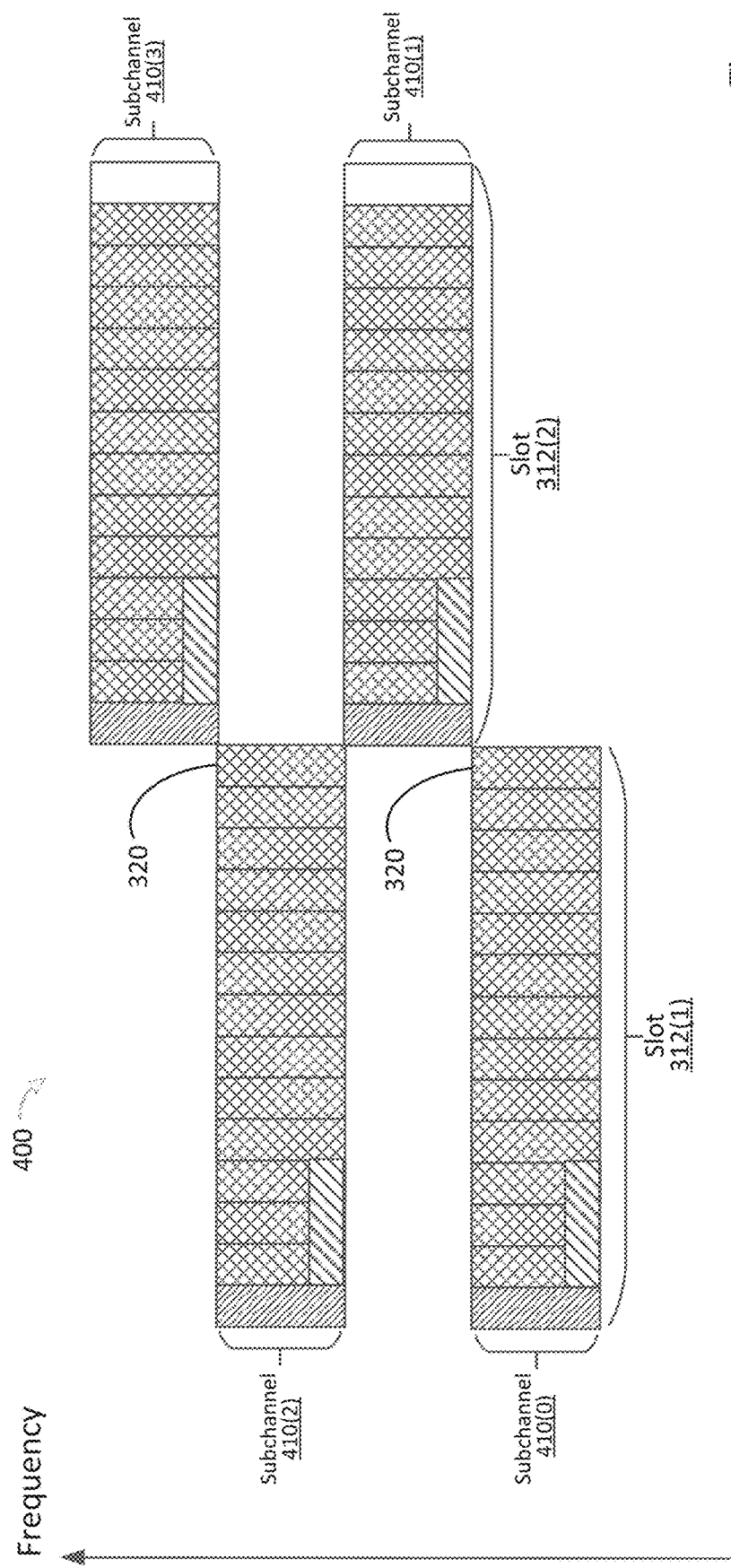
FIG. 4 illustrates interleaved resources associated with continuous transmissions according to some aspects of the present disclosure.

FIG. 4 illustrates resources 400 associated with continuous transmissions according to some aspects of the present disclosure. In FIG. 4, the x-axis represents time in some arbitrary units and the y-axis represents frequency in some arbitrary units. In some aspects, a first sidelink UE may receive an indicator from the BS indicating time resources and/or frequency resources 300 for transmitting the first PSSCH 316 in the gap symbol 320 and/or transmitting the second PSSCH 316 in slot 312(2) contiguous with the gap symbol 320. The first sidelink UE may receive a time domain resources allocation (TDRA) and/or a frequency domain resources allocation (FDRA) from the BS. In this regard, the first sidelink UE may receive the TDRA/FDRA from the BS via DCI (e.g., a DCI-3.0 message) or other suitable communication.

In some aspects, the first sidelink UE may transmit an indicator to the second sidelink UE indicating the TDRA/FDRA for transmitting the first PSSCH 316 in the gap symbol 320 of slot 312(1) and/or transmitting the second PSSCH 316 in slot 312(2) contiguous with the gap symbol 320. The first sidelink UE may transmit the TDRA and/or the FDRA to the second sidelink UE via SCI (e.g., SCI-1 via PSCCH 318 and/or SCI-2 via PSSCH 316). The first sidelink UE may transmit the TDRA and/or the FDRA to the second sidelink UE in the same or different SCI as the indicator associated with occupancy of the channel-access gap symbol 320.

In some aspects, when the first sidelink UE transmits a first PSSCH 316 communication to the second sidelink UE in the gap symbol 320 and a second PSSCH 316 communication in a slot contiguous with the gap symbol 320, the first sidelink UE may transmit the first and second PSSCHs 316 in the same frequency band(s) (e.g., same frequency subchannel(s) 410). The first sidelink UE may indicate the frequency band(s) for the first and second PSSCH 316 transmissions to the second sidelink UE. In some instances, the first sidelink UE may indicate the frequency band(s) for the first and second PSSCH 316 transmissions to the second sidelink UE in the FDRA via SCI (e.g., SCI-1 via PSCCH 318 and/or SCI-2 via PSSCH 316).

In some aspects, when the first sidelink UE transmits a first PSSCH 316 communication to the second sidelink UE in the gap symbol 320 and a second PSSCH 316 communication in slot 312(2) contiguous with the gap symbol 320, the first sidelink UE may transmit the first and second PSSCH 316s in different frequency subchannel(s) 410. For example, the first sidelink UE may transmit the first PSSCH 316 communication in the gap symbol 320 of slot 312(1) associated subchannels 410(0) and 410(2) and transmit the second PSSCH 316 communication in slot 312(2) associated subchannels 410(1) and 410(3). In some aspects, the first sidelink UE may transmit the first PSSCH 316 communication in the gap symbol 320 of slot 312(1) associated with a first frequency interlace (e.g., even subchannel indexes) and transmit the second PSSCH 316 communication in contiguous slot 312(2) associated with a second frequency interlace (e.g., odd subchannel indexes). The first frequency interlace may be the same or different from the second frequency interlace. For instance, the BS may transmit a configuration to the first sidelink UE indicating a first frequency interlace (e.g., subchannels 410(0) and 410(2)) for slot 312(1) that includes the gap symbol 320 carrying the first PSSCH 316 communication and a second frequency interlace (e.g., subchannels 410(1) and 410(3)) for slot 312(2) for carrying the second PSSCH 316 communication. In this regard, the first and second frequency interlaces may be indicated by the FDRA. The first and second PSSCH 316 communications may be frequency interlaced over a frequency band (e.g., a 20 MHz frequency band, a 40 MHz frequency band, an 80 MHz frequency band, a 160 MHz frequency band, a licensed frequency band, an unlicensed frequency band, etc.).

The first and second frequency interlaces may include a plurality of frequency interlaces over a 20 MHz band or other suitable band, where each frequency interlace may include a plurality of resource blocks (RBs) distributed over the frequency band. The first and second frequency interlaces may include every second, third, fourth, or other increment of subchannels over the unlicensed frequency band. In some aspects, the first PSSCH 316 may be transmitted in one or more gap symbols 320 of the first frequency interlace while the second PSSCH 316 is transmitted over a single frequency band (e.g., a non-interlaced frequency band).

In some aspects, the first sidelink UE may receive a grant (e.g., a configured grant, a dynamic grant) from a BS for time/frequency resources 400 for transmitting one or more PSSCH 316 communications in one or more gap symbols 320 associated with one or more slots 312 (e.g., contiguous slots). The time/frequency resources 400 may be intra-grant resources. In this regard, the time/frequency resources 400 for transmitting one or more PSSCHs 316 may be received by the first sidelink UE from the BS in a single grant (e.g., a single configured grant, a single dynamic grant) via a single DCI message (e.g., a single DCI 3-0 message) or other suitable communication. The single grant may be associated with a semi-static configuration of a resource pool. In some aspects, the time/frequency resources in the grant may be dedicated to the first sidelink UE.

In some aspects, the message including the grant may also include one or more code points indicating whether the first sidelink UE may occupy (e.g., transmit in) the gap symbol 320 of each of the slots 312 associated with the intra-grant time/frequency resources. In this regard, a single code point may indicate whether the first sidelink UE may transmit in the gap symbol 320 in all the slots 312 of the intra-grant resources. Additionally or alternatively, different code points may individually indicate whether the first sidelink UE may transmit in the gap symbol 320 in each of the slots 312 of the intra-grant resources and/or a group of slots 312 of the intra-grant resources.

In some aspects, the first sidelink UE may receive multiple grants (e.g., multiple configured grants, multiple dynamic grants, or a combination of configured and dynamic grants) from a BS for time/frequency resources 400 for transmitting one or more PSSCH 316 communications in one or more gap symbols 320 associated with one or more slots 312 (e.g., contiguous slots). The time/frequency resources 400 may be inter-grant resources. In this regard, the time/frequency resources 400 for transmitting the first PSSCH 316 may be received by the first sidelink UE from the BS in a first grant (e.g., a first configured grant, a first dynamic grant) via a first DCI message (e.g., a DCI 3-0 message) or other suitable communication, while the time/frequency resources for transmitting the second PSSCH 316 may be received in a second grant (e.g., a second configured grant, a second dynamic grant) via a second DCI message or other suitable communication. The first and second grants may be associated with a semi-static configuration of a resource pool. In some aspects, the time/frequency resources in the first grant and/or the second grant may be dedicated to the first sidelink UE.

In some aspects, each of the first and second messages including the grants may also include one or more code points indicating whether the first sidelink UE may occupy (e.g., transmit in) the gap symbol 320 of each of the slots associated with the inter-grant time/frequency resources. In this regard, a single code point in the first DCI message may indicate whether the first sidelink UE may transmit in the gap symbol 320 in all the slots 312 of the first grant. A single code point in the second DCI message may indicate whether the first sidelink UE may transmit in the gap symbol 320 in all the slots 312 of the second grant. Additionally or alternatively, different code points in the first DCI message and the second DCI message may individually indicate whether the first sidelink UE may transmit in the gap symbol 320 in each of the slots 312 of the inter-grant resources.

In some aspects, the first sidelink UE may transmit the first PSSCH 316 communication via the entire gap symbol 320. Additionally or alternatively, the first sidelink UE may transmit the first PSSCH 316 communication via a first portion of the gap symbol 320 and refrain from transmitting the first PSSCH 316 communication during a second portion of the gap symbol 320. In this regard, the first sidelink UE may use a cyclic prefix (CP) extension to create the second portion (e.g., a gap duration) of the gap symbol 320. The second portion may be about 16 µs to about 25 µs. The second portion may be contiguous with the first symbol of adjacent (e.g., contiguous) slot 312(2). The second portion of the gap symbol 320 in which the first sidelink UE is not transmitting may be used by other UE(s). For example, other UE(s) may perform radio resource management (RRM) measurements during the second portion of the gap symbol 320. In some aspects, other UE(s) may perform an LBT (e.g., type 2 LBT) during the second portion to facilitate channel occupancy time (COT) sharing among other UE(s). The first sidelink UE may receive an indicator from a BS (e.g., the BS 105 or 800) indicating the first sidelink UE should transmit the first PSSCH 316 communication via a first portion of the gap symbol 320 and refrain from transmitting during the second portion. The first sidelink UE may receive the indicator from the BS via DCI (e.g., DCI 3-0), a PDCCH, a PSSCH, an RRC message, a MAC-CE message, or other suitable communication.

Figure 5:
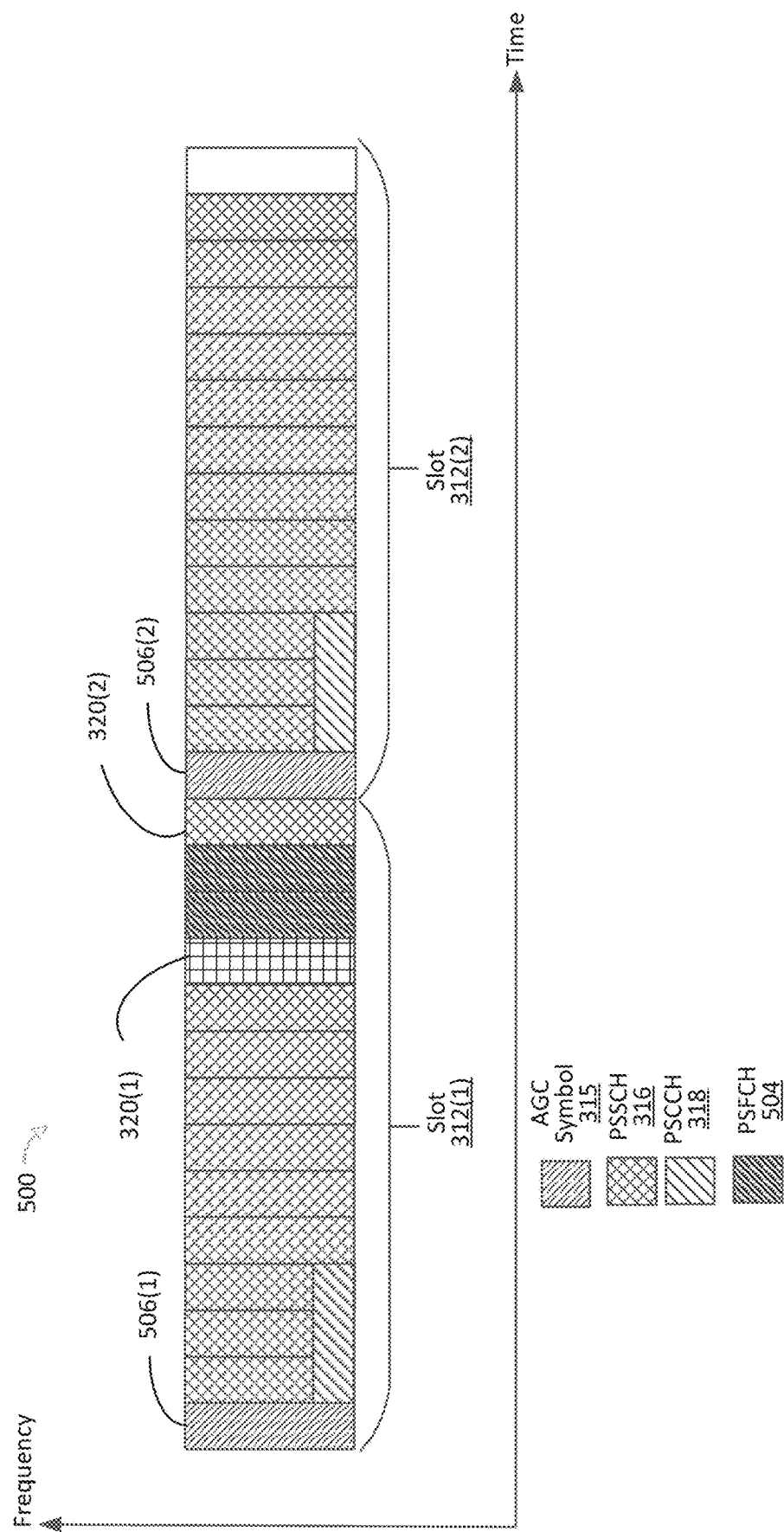
FIG. 5 illustrates resources associated with continuous transmissions according to some aspects of the present disclosure.

FIG. 5 illustrates resources 500 associated with continuous transmissions according to some aspects of the present disclosure. In FIG. 5, the x-axis represents time in some arbitrary units and the y-axis represents frequency in some arbitrary units. In some aspects, the first sidelink UE may transmit a first PSSCH 316 communication in slot 312(1) that includes PSFCH 504. The slot 312(1) that includes a PSFCH 504 may include multiple gap symbols 320. In this case, the first sidelink UE may receive an indicator from the BS indicating whether the first sidelink VIE may transmit a first PSSCH 316 communication in one or more of the multiple gap symbols 320. For example, the first sidelink UE may receive the indicator from the BS using code points and/or a bitmap indicating which of the gap symbols 320 the first sidelink UE may transmit in. In this regard, the first sidelink UE may receive the indicator from the BS via DCI (e.g., DCI 3-0), a PDCCH, a PDSCH, an RRC message, a MAC-CE message, or other suitable communication. For example, the first sidelink UE may transmit the first PSSCH 316 communication in gap symbol 320(1) located at symbol index (10) based on the indicator (e.g., code points and/or a bitmap indicating which of the gap symbols 320 the first sidelink UE may transmit in), transmit a PSFCH 504 communication in symbol indexes (11) and (12), continue the transmission of the first PSSCH 316 communication in gap symbol 320(2) located at symbol index (13) based on the indicator, and transmit a second PSSCH 316 communication in slot 312(2).

In some aspects, the first sidelink UE may transmit a first PSSCH 316 communication in slot 312(1) that includes a scheduled PSFCH 504. However, the first sidelink UE may not have any HARQ feedback to transmit in slot 312(1) via the PSFCH 504. In this case, the first sidelink UE may transmit the first PSSCH 316 communication in symbols that include the scheduled PSFCH 504 (e.g., symbol indexes 11 and 12). In some aspects, the first sidelink UE may transmit PSSCH 316 communications in scheduled PSFCH 504 symbols in slot 312(1) in which the first sidelink UE does not have HARQ feedback to transmit. The BS may determine whether the first sidelink UE may transmit the first PSSCH 316 communication in the symbols that include the scheduled PSFCH 504 based on whether the first sidelink UE has received one or more PSSCH 316 communications that require the first sidelink UE to transmit HARQ feedback.

In some aspects, the first sidelink UE may transmit a first PSSCH 316 communication in gap symbols 320(1) and 320(2) and a second PSSCH 316 communication in slot 312(2) contiguous with the gap symbol 320(2). Slot 312(2) may include an automatic gain control (AGC) symbol 506(2). The AGC symbol 506(2) be located in symbol index (0) (e.g., the leading symbol) of slot 312(2). The first sidelink UE may receive an indicator from the BS associated with occupancy of the AGC symbol 506(2) in slot 312(2). The indicator may indicate whether the first sidelink UE may transmit the second PSSCH 316 communication in the AGC symbol 506(2) of slot 312(2). In this regard, the first sidelink UE may receive the indicator from the BS via DCI (e.g., DCI 3-0), a PDCCH, a PDSCH, an RRC message, a MAC-CE message, or other suitable communication. In some instances, the AGC symbol 506(2) of slot 312(2) may be used by the second sidelink UE receiving the first and second PSSCH 316 communications to calibrate the gain of its receiver. In this regard, the second sidelink UE may use the AGC symbol 506(1) of slot 312(1) that carries the first PSSCH 316 communication to calibrate its receiver and may not require the AGC symbol 506(2) of slot 312(2) for receiver calibration. The AGC symbol 506(2) of slot 312(2) contiguous with the gap symbol 320(2) may carry the second PSSCH 316.

Figure 6:
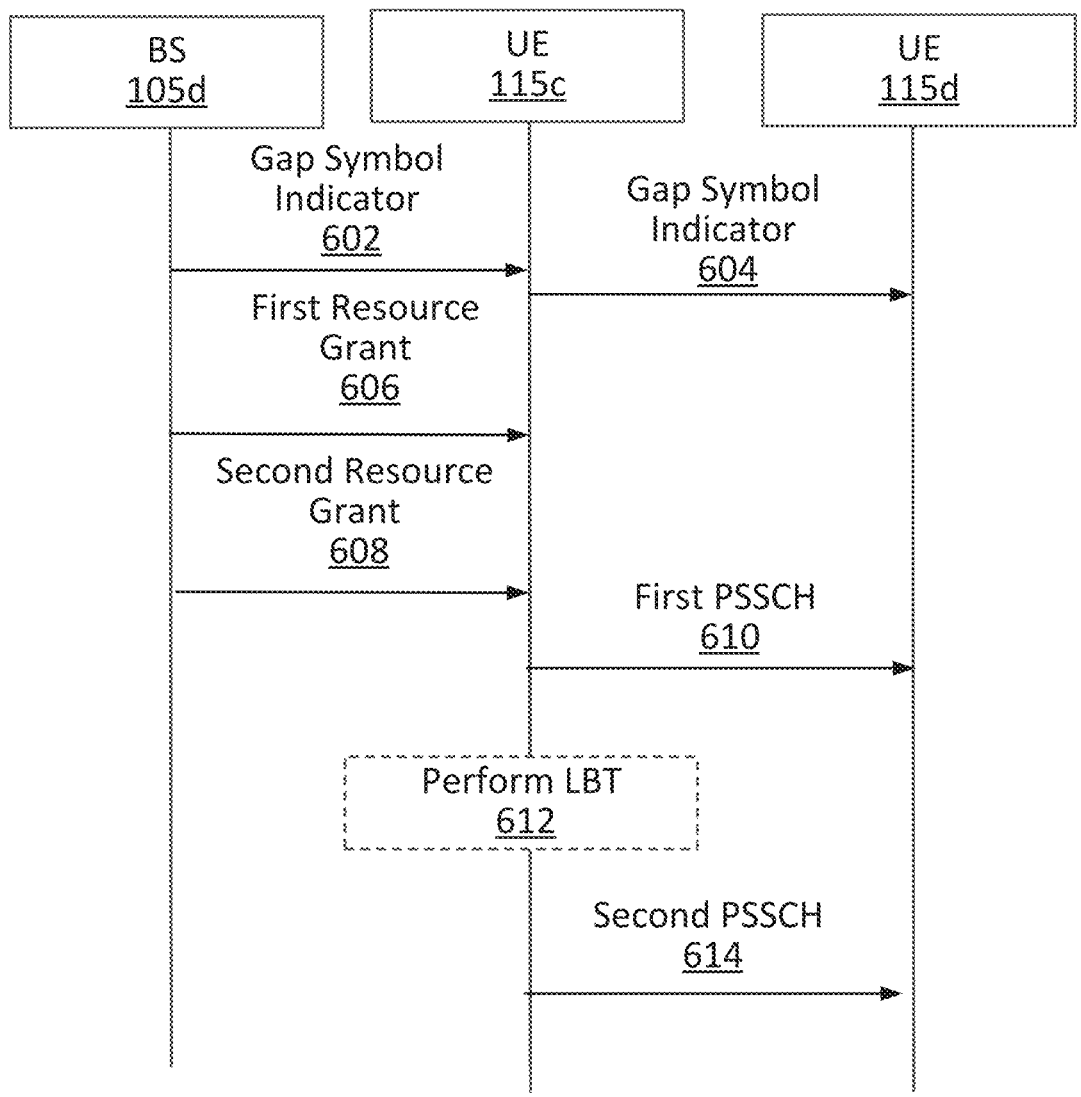
FIG. 6 is a signaling diagram of a wireless communication method according to some aspects of the present disclosure.

FIG. 6 is a signaling diagram of a communication method 600 according to some aspects of the present disclosure. Actions of the communication method 600 can be executed by a computing device (e.g., a processor, processing circuit, and/or other suitable component) of a communication device or other suitable means for performing the actions. For example, a wireless communication device, such as the UE 115 or UE 700, may utilize one or more components, such as the processor 702, the memory 704, the continuous transmission module 708, the transceiver 710, the modem 712, and the one or more antennas 716, to execute aspects of method 600.

At action 602, the BS 105d may transmit a gap symbol indicator to the UE 115c. In this regard, the BS 105d may transmit the gap symbol indicator to the UE 115c via DCI (e.g., DCI 3-0), a PDCCH, a PDSCH, an RRC message, a MAC-CE message, or other suitable communication. In some aspects, the BS 105d may transmit the indicator to the UE 115c as a code point. In some instances, the code point may be a single bit (e.g., 0 or 1) indicating whether the UE 115c may occupy (e.g., transmit in) a gap symbol. For example, the UE 115c may receive a code point "1" to indicate the UE 115c may transmit in the gap symbol or a code point "0" to indicate the UE 115c may not transmit in the gap symbol. When the indicator received by the UE 115c indicates the UE 115c may transmit in the gap symbol, the BS 105d may block LBT attempts by other sidelink UEs to enable the UE 115c to transmit in the gap symbol.

At action 604, the UE 115c may transmit the gap symbol indicator to the UE 115d. In this regard, the UE 115c may transmit the indicator to the UE 115d via SCI (e.g., SCI-1, SCI-2) or other suitable communication. In some aspects, the UE 115c may transmit the indicator to the UE 115d as a code point via SCI (e.g., SCI-1, SCI-2) or other suitable communication.

At action 606, the BS 105d may transmit a first resource grant to the UE 115c. The first resource grant may be for time/frequency resources for the UE 115c to transmit one or more PSSCH communications in one or more gap symbols associated with one or more slots.

At action 608, the BS 105d may transmit a second resource grant to the UE 115c. The second resource grant may be for time/frequency resources for the UE 115c to transmit one or more PSSCH communications in one or more gap symbols associated with one or more slots. The second resource grant may be for resources different from the first resource grant. In some aspects, the UE 115c may receive multiple grants (e.g., multiple configured grants, multiple dynamic grants, or a combination of configured and dynamic grants) from the BS 105d for time/frequency resources for transmitting one or more PSSCH communications in one or more gap symbols associated with one or more slots (e.g., contiguous slots). The time/frequency resources may be inter-grant resources. In this regard, the time/frequency resources for transmitting the first PSSCH may be received by the UE 115c from the BS 105d in the first grant (e.g., a first configured grant, a first dynamic grant) via a first DCI message (e.g., a DCI 3-0 message) or other suitable communication, while the time/frequency resources for transmitting the second PSSCH may be received in the second grant (e.g., a second configured grant, a second dynamic grant) via a second message or other suitable communication. The first and second grants may be associated with a semi-static configuration of a resource pool. In some aspects, the time/frequency resources in the first grant and/or the second grant may be dedicated to the UE 115c.

At action 610, the UE 115c may transmit a first PSSCH communication to the UE 115d via the gap symbol based on the indicator associated with the occupancy of the gap symbol received at action 602. By utilizing the gap symbol to transmit the first PSSCH communication, the UE 115c may increase the communications capacity of the wireless network (e.g., the wireless network 100, 200, or 201) and/or increase the communications capacity between the UE 115c and UE 115d. In some aspects, the first PSSCH communication may carry one or more transport blocks (TBs).

At action 612, the UE 115c may perform an LBT in a CP extension of the gap symbol. In some aspects, the UE 115c may receive an indicator from the BS 105d indicating whether the UE 115c should perform an LBT before transmitting the second PSSCH communication. In this regard, the UE 115c may receive the indicator from the BS 105d via DCI (e.g., DCI 3-0), a PDCCH, a PDSCH, an RRC message, a MAC-CE message, or other suitable communication. The UE 115c may perform the LBT in a second portion of the gap symbol (e.g., a CP extension duration). For example, the UE 115c may select a CP extension duration of about 16 µs, about 25 µs, or other suitable duration for a CAT2 LBT to be performed prior to the second PSSCH communication. The gap symbol duration may vary depending on an SCS and/or a number of subcarriers in a symbol. Thus, the CP extension duration may be dependent on the SCS and/or the number of subcarriers in a symbol.

At action 614, the UE 115c may transmit a second PSSCH communication to the UE 115d. In this regard, the UE 115c may transmit the second PSSCH communication in a slot contiguous with the second portion of the gap symbol based on a successful LBT at action 612. The UE 115c may refrain from transmitting the second PSSCH communication based on an unsuccessful LBT at action 612.

Figure 7:
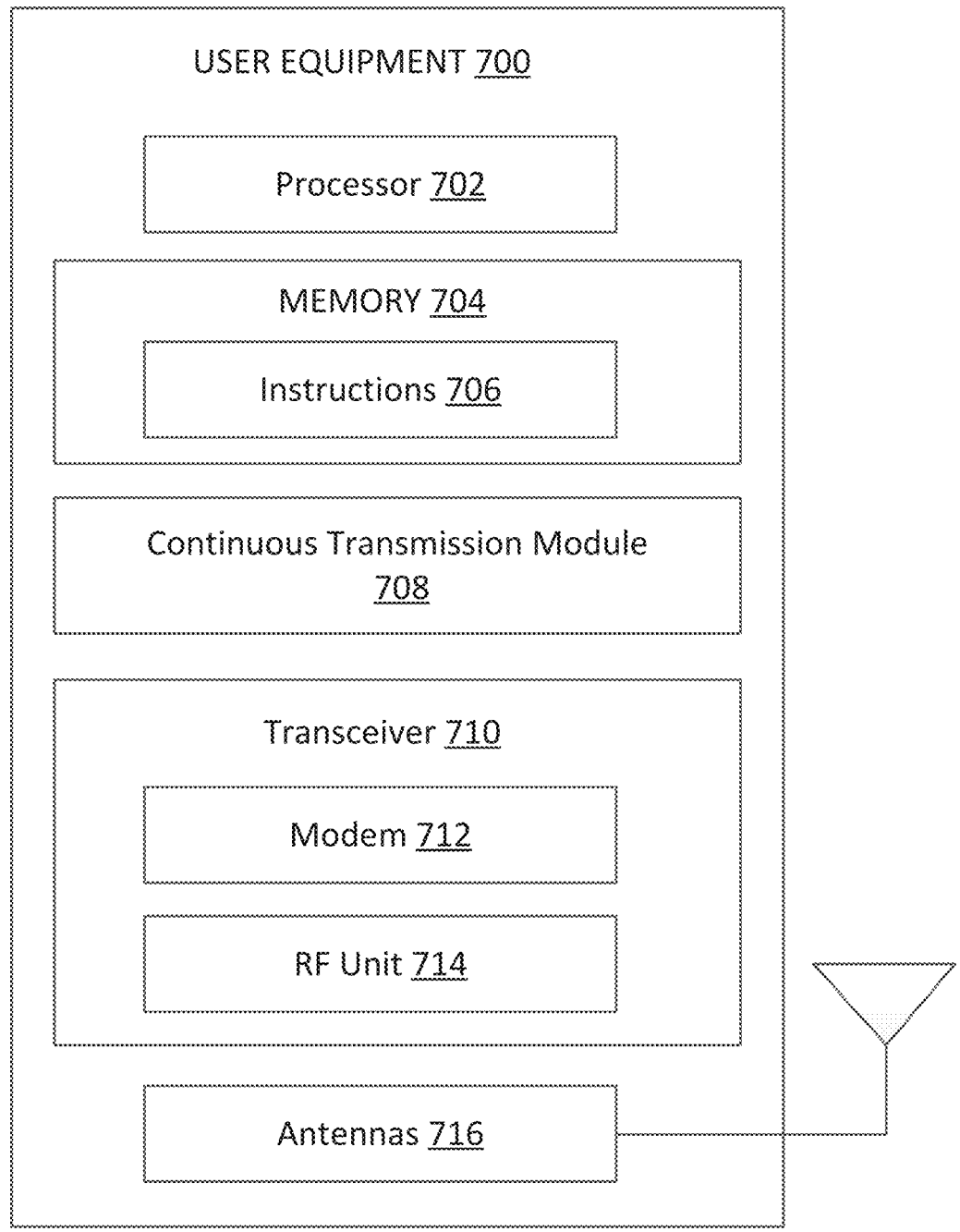
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100, 200, or 201 as discussed above. As shown, the UE 700 may include a processor 702, a memory 704, a continuous transmission module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 3-6. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The continuous transmission module 708 may be implemented via hardware, software, or combinations thereof. For example, the continuous transmission module 708 may be implemented as a processor, circuit, and/or instructions 706 stored in the memory 704 and executed by the processor 702. In some aspects, the continuous transmission module 708 may receive an indicator from a BS associated with occupancy of a channel-access gap symbol. The continuous transmission module 708 may transmit a first physical sidelink shared channel (PSSCH) communication to a receiving sidelink UE via the channel-access gap symbol based on the indicator associated with the occupancy of the channel-access gap symbol.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

Figure 8:
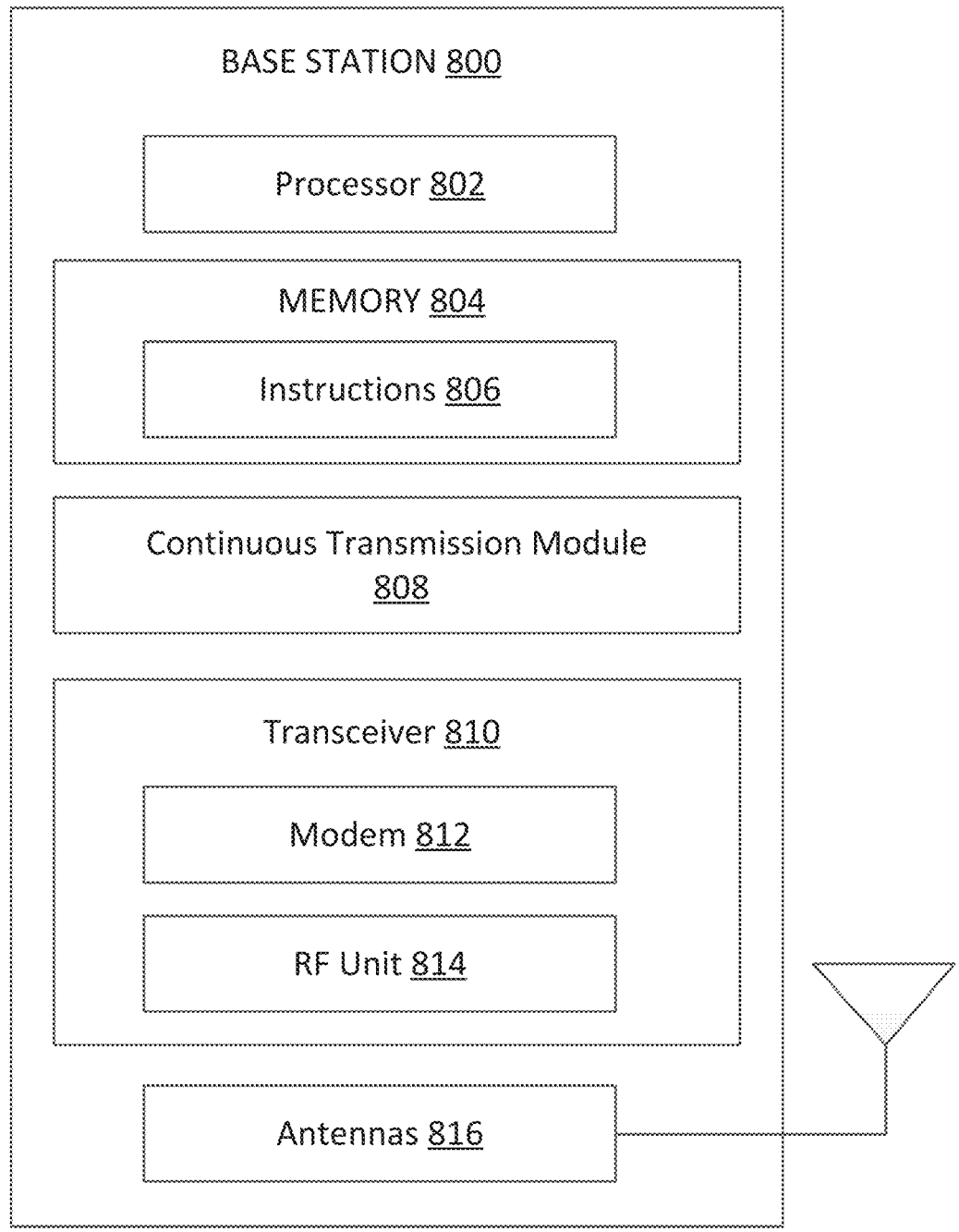
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a continuous transmission module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 10-11. Instructions 806 may also be referred to as code, which may be interpreted broadly to include any type of computer-readable statement(s).

The continuous transmission module 808 may be implemented via hardware, software, or combinations thereof. For example, the continuous transmission module 808 may be implemented as a processor, circuit, and/or instructions 806 stored in the memory 804 and executed by the processor 802.

In some aspects, the continuous transmission module 808 may implement the aspects of FIGS. 3-6. For example, the continuous transmission module 808 may transmit a gap symbol indicator to a UE (e.g., UE 115 or 700). In this regard, the continuous transmission module 808 may transmit the indicator to the UE via DCI (e.g., DCI 3-0), a PDCCH, a PDSCH, an RRC message, a MAC-CE message, or other suitable communication.

Additionally or alternatively, the continuous transmission module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 600. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

Figure 9:
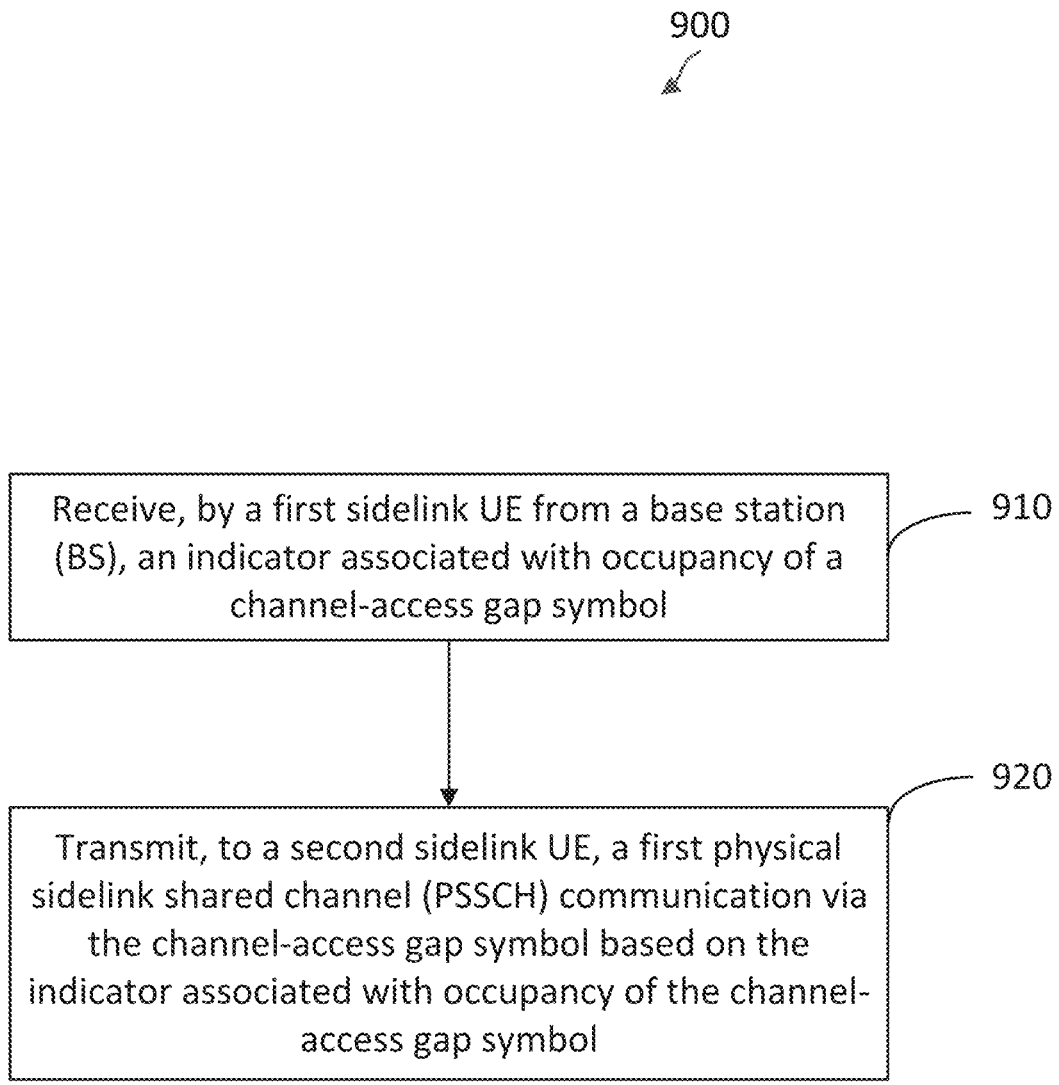
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the aspects. For example, a wireless communication device, such as the UE 115 or UE 700, may utilize one or more components, such as the processor 702, the memory 704, the continuous transmission module 708, the transceiver 710, the modem 712, and the one or more antennas 716, to execute aspects of method 900. The method 900 may employ similar mechanisms as in the networks 100, 200, and/or 201 and the aspects and actions described with respect to FIGS. 3-6. As illustrated, the method 900 includes a number of enumerated aspects, but the method 900 may include additional aspects before, after, and in between the enumerated aspects. In some aspects, one or more of the enumerated aspects may be omitted or performed in a different order.

At action 910, the method 900 includes a first sidelink UE (e.g., the UE 115 or the UE 700) receiving an indicator from a base station (BS) associated with an occupancy of a channel-access gap symbol. In this regard, the first sidelink UE may receive the indicator from the BS (e.g., the BS 105 or 800) via a PDCCH, a PDSCH, DCI, an RRC message, a MAC-CE message, or other suitable communication. In some aspects, the first sidelink UE may receive the indicator from the BS as a code point. The first sidelink UE may receive the code point via downlink control information (DCI) (e.g., a DCI-3.0 message) or other suitable communication. In some instances, the code point may be a single bit (e.g., 0 or 1) indicating whether the first sidelink UE may occupy (e.g., transmit in) the gap symbol. For example, the first sidelink UE may receive a code point "1" to indicate the first sidelink UE may transmit in the gap symbol or a code point "0" to indicate the first sidelink UT may not transmit in the gap symbol.

When the indicator received by the first sidelink UE indicates the first sidelink UE may transmit in the gap symbol, the BS may block LBT attempts by other sidelink UEs to enable the first sidelink UE to transmit in the gap symbol. The first sidelink UE may transmit a first PSSCH communication in the gap symbol and transmit a second PSSCH communication in a slot contiguous with the gap symbol (e.g., a slot before the gap symbol and/or a slot after the gap symbol).

In some aspects, the indicator associated with the occupancy of the channel-access gap symbol may be based on a channel access priority class (CAPC) associated with a second PSSCH communication. The first sidelink UE may intend to transmit a first PSSCH communication in a gap symbol of a first slot and transmit the second PSSCH communication in a slot contiguous with the gap symbol. The indicator associated with the gap symbol may indicate the first sidelink UE is allowed to transmit in the gap symbol when the CAPC value (e.g., CAPC value of 1, 2, 3, 4, or more) associated with the second PSSCH communication satisfies a threshold. Conversely, the indicator associated with the gap symbol may indicate the first sidelink IE is not allowed to transmit in the gap symbol when the CAPC value associated with the second PSSCH communication does not satisfy a threshold. The threshold may include a single CAPC value and/or a range of CAPC values. For example, in some instances the threshold is satisfied when the CAPC value associated with the second PSSCH communication is lesser than the single CAPC value, less than or equal to the single CAPC value, and/or included in the range of CAPC values. In some instances, the threshold is not satisfied when the CAPC value associated with the second PSSCH communication is greater than the single CAPC value, greater than or equal to the single CAPC value, and/or not included in the range of CAPC values.

The first sidelink UE may receive the threshold value(s) and/or the CAPC value associated with the second PSSCH communication from the BS (e.g., the BS 105 or 800) via a PDCCH, a PDSCH, DCI, an RRC message, a MAC-CE message, or other suitable communication. In some aspects, the first sidelink UE may receive the threshold and/or the CAPC value associated with the second PSSCH communication from the BS via downlink control information (DCI) (e.g., a DCI-3.0 message). Additionally or alternatively, the first sidelink UE may determine the CAPC of the second PSSCH communication based on a priority level associated with a TB to be transmitted in the second PSSCH communication.

At action 920, the method 900 includes a first sidelink UE (e.g., the UE 115 or the UE 700) transmitting a first physical sidelink shared channel (PSSCH) communication to a second sidelink UE via the channel-access gap symbol based on the indicator associated with the occupancy of the channel-access gap symbol. By utilizing the channel-access gap symbol to transmit the first PSSCH communication, the first sidelink UE may increase the communications capacity of the wireless network (e.g., the wireless network 100, 200, or 201) and/or increase the communications capacity between the first and second sidelink UEs. In some aspects, the first PSSCH communication and/or the second PSSCH communication may carry one or more transport blocks (TBs).

In some aspects, the first sidelink UE may transmit the indicator associated with occupancy of the channel-access gap symbol to the second sidelink UE. The indicator may be the same indicator received by the first sidelink UE from the BS (e.g., a code point) or the indicator may be different from the indicator received by the first sidelink UE from the BS. For example, the indicator may be a TDRA transmitted via SCI to the second sidelink UE indicating resources in the gap symbol for the first sidelink UE to transmit a PSSCH communication. The first sidelink UE may transmit the indicator to the second sidelink UE as a code point via SCI (e.g., SCI-1 and/or SCI-2). The code point may be a single bit (e.g., 0 or 1) indicating whether the first sidelink UE may occupy (e.g., transmit in) the gap symbol. For example, the first sidelink UE may transmit a code point "1" in SCI to indicate the first sidelink UE may transmit to the second sidelink UE in the gap symbol or a code point "0" in SCI to indicate the first sidelink UE may not transmit to the second sidelink UE in the gap symbol. In some aspects, the first sidelink UE may transmit an indicator to the second sidelink UE indicating whether the first sidelink UE may occupy (e.g., transmit in) the gap symbol of a plurality of slots and/or a sequence (e.g., contiguous sequence) of slots. In this regard, the first sidelink UE may transmit an indicator indicating the number of slots the first sidelink UE may occupy the gap symbol and/or the indexes associated with the slots in which the first sidelink UE may occupy the gap symbol.

In some aspects, the first sidelink UE may transmit a second PSSCH communication to the second sidelink UE in a slot contiguous with the channel-access gap symbol based on the indicator associated with the occupancy of the channel-access gap symbol. In this regard, the first sidelink UE may transmit the first PSSCH in the gap symbol (e.g., symbol index 13) of a first slot and transmit the second PSSCH in a second slot that is contiguous with the gap symbol of the first slot.

In some aspects, the first sidelink UE may receive an indicator from the BS indicating time resources and/or frequency resources for transmitting the first PSSCH in the gap symbol and/or transmitting the second PSSCH in a slot contiguous with the gap symbol (e.g., a slot before the gap symbol and/or a slot after the gap symbol). The first sidelink UE may receive a time domain resources allocation (TDRA) and/or a frequency domain resources allocation (FDRA) from the BS. In this regard, the first sidelink UE may receive the TDRA/FDRA from the BS via DCI (e.g., a DCI-3.0 message) or other suitable communication.

In some aspects, the first sidelink UE may transmit an indicator to the second sidelink UE indicating the TDRA/FDRA for transmitting the first PSSCH in the gap symbol and/or transmitting the second PSSCH in a slot contiguous with the gap symbol. The first sidelink UE may transmit the TDRA and/or the FDRA to the second sidelink UE via SCI (e.g., SCI-1 and/or SCI-2). The first sidelink UE may transmit the TDRA and/or the FDRA to the second sidelink UE in the same or different SCI as the indicator associated with occupancy of the channel-access gap symbol.

In some aspects, when the first sidelink UE transmits a first PSSCH communication to the second sidelink UE in the gap symbol and a second PSSCH communication in a slot contiguous with the gap symbol, the first sidelink UE may transmit the first and second PSSCHs in the same frequency band(s) (e.g., same frequency subchannel(s)). The first sidelink UE may indicate the frequency band(s) for the first and second PSSCH transmissions to the second sidelink UE. In some instances, the first sidelink UE may indicate the frequency band(s) for the first and second PSSCH transmissions to the second sidelink UE in the FDRA via SCI.

In some aspects, when the first sidelink UE transmits a first PSSCH communication to the second sidelink UE in the gap symbol and a second PSSCH communication in a slot contiguous with the gap symbol, the first sidelink UE may transmit the first and second PSSCHs in different frequency band(s) (e.g., different frequency subchannel(s)). For example, the first sidelink UE may transmit the first PSSCH communication in the gap symbol of a slot associated with a first frequency and transmit the second PSSCH communication in a slot associated with a second frequency. In some aspects, the first sidelink UE may transmit the first PSSCH communication in the gap symbol of a slot associated with a first frequency interlace and transmit the second PSSCH communication in a contiguous slot associated with a second frequency interlace. The first frequency interlace may be the same or different from the second frequency interlace. For instance, the BS may transmit a configuration to the first sidelink UE indicating a first frequency interlace for a slot that includes the gap symbol carrying the first PSSCH and a second frequency interlace for a slot contiguous with the slot that includes the gap symbol. The second PSSCH communication may be transmitted using the second frequency interlace. In this regard, the first and second frequency interlaces may be indicated by the FDRA. The first and second PSSCH communications may be frequency interlaced over a frequency band (e.g., a 20 MHz frequency band, a 40 MHz frequency band, an 80 MHz frequency band, a 160 MHz frequency band, a licensed frequency band, an unlicensed frequency band, etc.).

The first and second frequency interlaces may include a plurality of frequency interlaces over a 20 MHz band or other suitable band, where each frequency interlace may include a plurality of resource blocks (RBs) distributed over the frequency band. The first and second frequency interlaces may include every second, third, fourth, or other increment of subchannels over the unlicensed frequency band. In some aspects, the first PSSCH may be transmitted in one or more gap symbols of the first frequency interlace while the second PSSCH is transmitted over a single frequency band (e.g., a non-interlaced frequency band).

In some aspects, the first sidelink UE may receive a grant (e.g., a configured grant, a dynamic grant) from a BS for time/frequency resources for transmitting one or more PSSCH communications in one or more gap symbols associated with one or more slots (e.g., contiguous slots). The time/frequency resources may be intra-grant resources. In this regard, the time/frequency resources for transmitting one or more PSSCHs may be received by the first sidelink UE from the BS in a single grant (e.g., a single configured grant, a single dynamic grant) via a single DCI message (e.g., a single DCI 3-0 message) or other suitable communication. The single grant may be associated with a semi-static configuration of a resource pool. In some aspects, the time/frequency resources in the grant may be dedicated to the first sidelink UE.

In some aspects, the message including the grant may also include one or more code points indicating whether the first sidelink UE may occupy (e.g., transmit in) the gap symbol of each of the slots associated with the intra-grant time/frequency resources. In this regard, a single code point may indicate whether the first sidelink UE may transmit in the gap symbol in all the slots of the intra-grant resources. Additionally or alternatively, different code points may individually indicate whether the first sidelink UE may transmit in the gap symbol in each of the slots of the intra-grant resources and/or a group of slots of the intra-grant resources.

In some aspects, the first sidelink UE may receive multiple grants (e.g., multiple configured grants, multiple dynamic grants, or a combination of configured and dynamic grants) from a BS for time/frequency resources for transmitting one or more PSSCH communications in one or more gap symbols associated with one or more slots (e.g., contiguous slots). The time/frequency resources may be inter-grant resources. In this regard, the time/frequency resources for transmitting the first PSSCH may be received by the first sidelink UE from the BS in a first grant (e.g., a first configured grant, a first dynamic grant) via a first DCI message (e.g., a DCI 3-0 message) or other suitable communication, while the time/frequency resources for transmitting the second PSSCH may be received in a second grant (e.g., a second configured grant, a second dynamic grant) via a second DCI message or other suitable communication. The first and second grants may be associated with a semi-static configuration of a resource pool. In some aspects, the time/frequency resources in the first grant and/or the second grant may be dedicated to the first sidelink UE.

In some aspects, each of the first and second messages including the grants may also include one or more code points indicating whether the first sidelink UE may occupy (e.g., transmit in) the gap symbol of each of the slots associated with the inter-grant time/frequency resources. In this regard, a single code point in the first DCI message may indicate whether the first sidelink UE may transmit in the gap symbol in all the slots of the first grant. A single code point in the second DCI message may indicate whether the first sidelink UE may transmit in the gap symbol in all the slots of the second grant. Additionally or alternatively, different code points in the first DCI message and the second DCI message may individually indicate whether the first sidelink UE may transmit in the gap symbol in each of the slots of the inter-grant resources.

In some aspects, the first sidelink UE may transmit the first PSSCH communication via the entire gap symbol. Additionally or alternatively, the first sidelink UE may transmit the first PSSCH communication via a first portion of the gap symbol and refrain from transmitting the first PSSCH communication during a second portion of the gap symbol. In this regard, the first sidelink UE may use a cyclic prefix (CP) extension to create the second portion (e.g., a gap duration) of the gap symbol. The second portion may be about 16 µs to about 25 µs. The second portion may be contiguous with the first symbol of an adjacent (e.g., contiguous) slot. The second portion of the gap symbol in which the first sidelink UE is not transmitting may be used by other UE(s). For example, other UE(s) may perform radio resource management (RRM) measurements during the second portion of the gap symbol. In some aspects, other UE(s) may perform an LBT (e.g., type 2 LBT) during the second portion to facilitate channel occupancy time (COT) sharing among other UE(s). The first sidelink UE may receive an indicator from a BS (e.g., the BS 105 or 800) indicating the first sidelink UE should transmit the first PSSCH communication via a first portion of the gap symbol and refrain from transmitting during the second portion. The first sidelink UE may receive the indicator from the BS via DCI (e.g., DCI 3-0), a PDCCH, a PDSCH, an RRC message, a MAC-CE message, or other suitable communication.

In some aspects, the first sidelink UE may receive an indicator from a BS indicating whether the first sidelink UE should perform an LBT before transmitting the second PSSCH communication. In this regard, the first sidelink UE may receive the indicator from the BS via DCI (e.g., DCI 3-0), a PDCCH, a PDSCH, an RRC message, a MAC-CE message, or other suitable communication. The first sidelink UE may perform the LBT in the second portion of the gap symbol (e.g., a CP extension duration). For example, the first sidelink UE may select a CP extension duration of about 16 µs, about 25 µs, or other suitable duration for a CAT2 LBT to be performed prior to the second PSSCH communication. The gap symbol duration may vary depending on an SCS and/or a number of subcarriers in a symbol. Thus, the CP extension duration may be dependent on the SCS and/or the number of subcarriers in a symbol. The first sidelink UE may transmit the second PSSCH communication in a slot contiguous with the second portion of the gap symbol based on a successful LBT. The first sidelink UE may refrain from transmitting the second PSSCH communication based on an unsuccessful LBT.

In some aspects, the first sidelink UE select from a first option including transmitting a first PSSCH communication in a first portion of the gap symbol and performing an LBT in the second portion of the gap symbol or a second option including rate matching the first PSSCH communication around the gap symbol. The first sidelink UE may select the first option or the second option based on, without limitation, a CAPC associated with the first PSSCH communication, a CAPC associated with the second PSSCH communication, a latency budget associated with the first PSSCH communication, a latency budget associated with the second PSSCH communication, a type of the first sidelink UE, a type of the second sidelink UE, scheduled transmissions associated with the first sidelink UE, scheduled transmissions associated with the second sidelink UE, and/or scheduled transmissions associated with a third sidelink UE in proximity to the first sidelink UE or the second sidelink UE. The first sidelink UE may transmit an indicator indicating the selected option to the second sidelink UE via SCI (e.g., (SCI-1, SCI-2). In some instances, the first sidelink UE may receive an indicator from a BS indicating which option (e.g., the first option or the second option) that the first sidelink UE should select. In this regard, the first sidelink UE may receive the option indicator semi-statically from the BS via an RRC message or other suitable communication. Additionally or alternatively, the first sidelink UE may receive the option indicator semi-statically from the BS via DCI (e.g., DCI 3-0) or other suitable communication. For example, the first sidelink UE may receive the option indicator semi-statically from the BS using code points transmitted via DCI (e.g., DCI 3-0) or other suitable communication.

The semi-static indicator may be transmitted by the BS on a resource pool basis, a configured grant basis, or based on a type of the first sidelink UE (e.g., an IOT UE, a vehicle, a smartphone). For example, in some instances the first sidelink UE may receive an allocation to a first resource pool. The semi-static indicator may indicate the UE shall perform an LBT in the second portion of the gap symbol for the first resource pool. When the first sidelink UE receives an allocation to a second resource pool, the semi-static indicator may indicate the UE shall not perform an LBT in the second portion of the gap symbol before transmitting the second PSSCH. In some instances, the first sidelink UE may receive a first configured grant. The semi-static indicator may indicate the UE shall perform an LBT in the second portion of the gap symbol for slots associated with the first configured grant. When the first sidelink UE receives a second configured grant, the semi-static indicator may indicate the UE shall not perform an LBT in the second portion of the gap symbol before transmitting the second PSSCH. Further, in some instances a semi-static indicator associated with one or more classes of UEs (e.g., based on device type and/or priority level(s)) may indicate that the UEs in the associated classes) shall perform an LBT in the second portion of the gap symbol, while a semi-static indicator associated with one or more other classes of UEs may indicate that the UEs in the associated class(es) shall not perform an LBT in the second portion of the gap symbol before transmitting the second PSSCH.

In some aspects, the first sidelink UE may indicate to the second sidelink UE (e.g., via TDRA/FDRA in SCI) that the first sidelink UE intends to transmit a first PSSCH to the second sidelink UE in the gap symbol. However, the second sidelink UE may intend to use the gap symbol for switching its transceiver from a receive mode to a transmit mode during the gap symbol in order for the second sidelink UE to transmit a communication (e.g., a high priority and/or low latency PSSCH communication) to a third sidelink UE or other device (e.g., the BS). In this case, the second sidelink UE may indicate (e.g., via a PC5-RRC message or other suitable communication) to the first sidelink UE that the second sidelink UE will refrain from switching its transceiver from receive to transmit mode during the gap symbol in order to receive the first PSSCH in the gap symbol. In some aspects, the second sidelink UE may indicate (e.g., via a PC5-RRC message or other suitable communication) to the first sidelink UE that the second sidelink UE will switch to a transmit mode during the gap symbol. In this case, the first sidelink UE may refrain from transmitting during the gap symbol to allow the second sidelink UE to transmit to the third sidelink UE. Additionally or alternatively, the BS may indicate to the first sidelink UE which slots the first sidelink UE may transmit during the gap symbol. The BS may be aware of the transmissions scheduled by the second sidelink UE and other sidelink UEs. The BS may not allow the first sidelink to transmit in gap symbols of slots that the second sidelink UE and/or other sidelink UEs may need to switch transmit/receive modes. In this regard, the first sidelink UE may transmit to the BS a list indicating the second sidelink UE and other sidelink UEs that the first sidelink UE intends to transmit to in the gap symbol. In this way, the BS may coordinate which slots the first sidelink UE may transmit PSSCHs in.

In some aspects, the first sidelink UE may transmit a first PSSCH communication in a slot that includes a physical sidelink feedback channel (PSFCH). The slot that includes a PSFCH may include multiple gap symbols. In this case, the first sidelink UE may receive an indicator from the BS indicating whether the first sidelink UE may transmit a first PSSCH communication in one or more of the multiple gap symbols. For example, the first sidelink UE may receive the indicator from the BS using code points and/or a bitmap indicating which of the gap symbols the first sidelink UE may transmit in. In this regard, the first sidelink UE may receive the indicator from the BS via DCI (e.g., DCI 3-0), a PDCCH, a PDSCH, an RRC message, a MAC-CE message, or other suitable communication. For example, the first sidelink UE may transmit the first PSSCH communication in gap symbol index (10) based on the indicator (e.g., code points and/or a bitmap indicating which of the gap symbols the first sidelink UE may transmit in), transmit a PSFCH communication in symbol indexes (11) and (12), continue the transmission of the first PSSCH communication in gap symbol index (13) based on the indicator, and transmit a second PSSCH communication in a slot contiguous with gap symbol index (13).

In some aspects, the first sidelink UE may transmit a first PSSCH communication in a slot that includes a scheduled PSFCH. However, the first sidelink UE may not have any HARQ feedback to transmit in the slot via the PSFCH. In this case, the first sidelink UE may transmit the first PSSCH communication in the symbols that include the scheduled PSFCH (e.g., symbol indexes 11 and 12). In some aspects, the first sidelink UE may transmit PSSCH communications in scheduled PSFCH symbols in each of the slots in which the first sidelink UE does not have HARQ feedback to transmit. The BS may determine whether the first sidelink UE may transmit the first PSSCH communication in the symbols that include the scheduled PSFCH based on whether the first sidelink UE has received one or more PSSCH communications that require the first sidelink UE to transmit HARQ feedback.

In some aspects, the first sidelink UE may transmit a first PSSCH communication in a gap symbol and a second PSSCH communication in a slot contiguous with the gap symbol. The slot contiguous with the gap symbol may include an automatic gain control (AGC) symbol. The AGC symbol may be located in symbol index (0) (e.g., the leading symbol of the slot). The first sidelink UE may receive an indicator from the BS associated with occupancy of the AGC symbol in the slot contiguous with the gap symbol. The indicator may indicate whether the first sidelink UE may transmit the second PSSCH communication in the AGC symbol of the slot contiguous with the gap symbol. In this regard, the first sidelink UE may receive the indicator from the BS via DCI (e.g., DCI 3-0), a PDCCH, a PDSCH, an RRC message, a MAC-CE message, or other suitable communication. In some instances, the AGC symbol of the slot contiguous with the gap symbol may be used by the second sidelink UE receiving the first and second PSSCH communications to calibrate the gain of its receiver. In this regard, the second sidelink UE may use the AGC symbol of the slot that carries the first PSSCH communication to calibrate its receiver and may not require the AGC symbol of the slot contiguous with the gap symbol for receiver calibration. The AGC symbol of the slot contiguous with the gap symbol may carry the second PSSCH.

Figure 10:
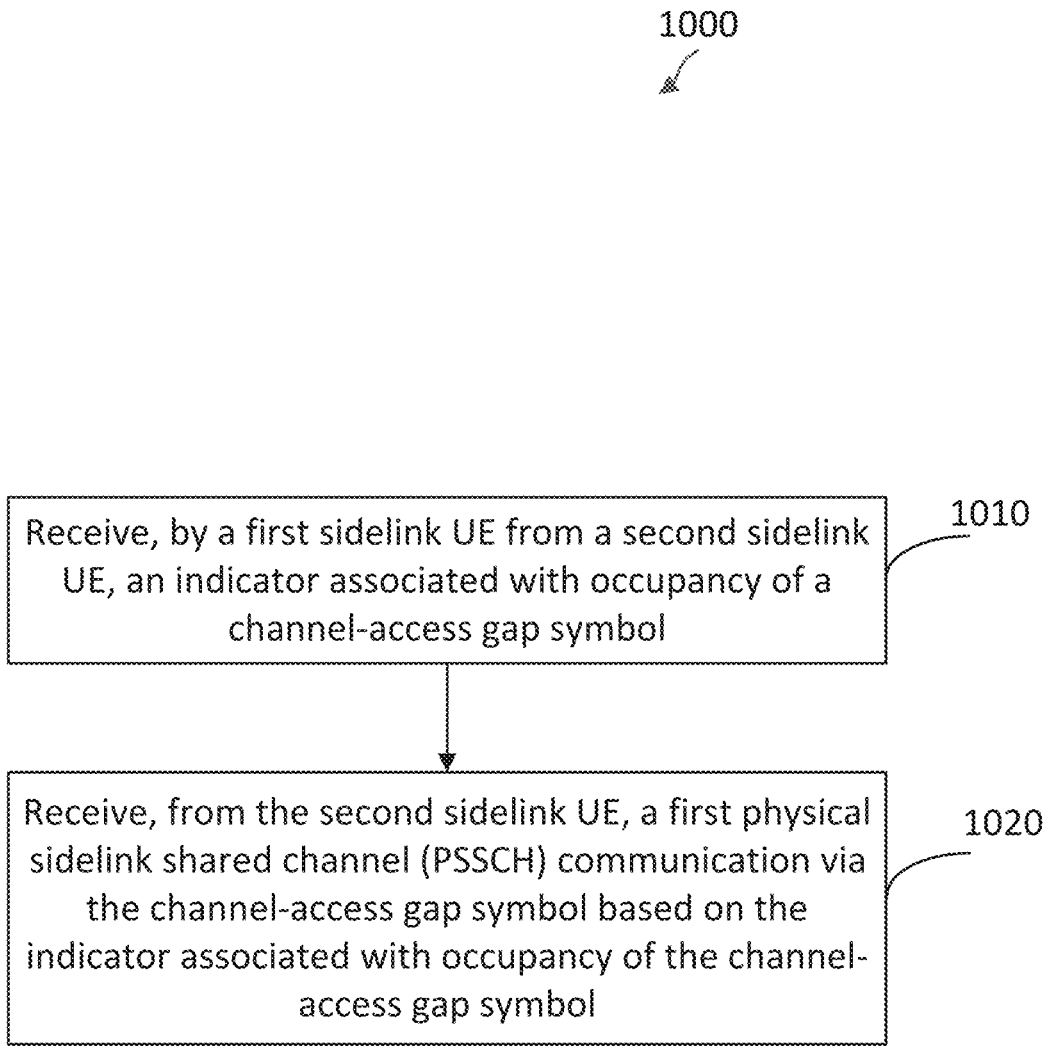
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the aspects. For example, a wireless communication device, such as the UE 115 or UE 700, may utilize one or more components, such as the processor 702, the memory 704, the continuous transmission module 708, the transceiver 710, the modem 712, and the one or more antennas 716, to execute aspects of method 1000. The method 1000 may employ similar mechanisms as in the networks 100, 200 and/or 201 and the aspects and actions described with respect to FIGS. 3-6. As illustrated, the method 1000 includes a number of enumerated aspects, but the method 1000 may include additional aspects before, after, and in between the enumerated aspects. In some aspects, one or more of the enumerated aspects may be omitted or performed in a different order.

At action 1010, the method 1000 includes a first sidelink UE (e.g., the UE 115 or the UE 700) receiving an indicator from a second sidelink UE (e.g., the UE 115 or the UE 700) associated with an occupancy of a channel-access gap symbol. In this regard, the first sidelink UE may receive the indicator from the second sidelink UE via SCI (e.g., SCI-1, SCI-2) or other suitable communication. In some aspects, the first sidelink UE may receive the indicator from the second sidelink UE as a code point. The first sidelink UE may receive the code point via SCI (e.g., SCI-1, SCI-2) or other suitable communication.

When the indicator received by the first sidelink UE indicates the second sidelink UE may transmit in the gap symbol, a BS may block LBT attempts by other sidelink UEs to enable the second sidelink UE to transmit in the gap symbol. The second sidelink UE may transmit a first PSSCH communication in the gap symbol and transmit a second PSSCH communication in a slot contiguous with the gap symbol (e.g., a slot before the gap symbol and/or a slot after the gap symbol).

In some aspects, the indicator associated with the occupancy of the channel-access gap symbol may be based on a channel access priority class (CAPC) associated with a second PSSCH communication. The second sidelink UE may intend to transmit a first PSSCH communication in a gap symbol of a first slot and transmit the second PSSCH communication in a slot contiguous with the gap symbol. The indicator associated with the gap symbol may indicate the second sidelink UE is allowed to transmit in the gap symbol when the CAPC value (e.g., CAPC value of 1, 2, 3, 4, or more) associated with the second PSSCH communication satisfies a threshold. Conversely, the indicator associated with the gap symbol may indicate the second sidelink UE is not allowed to transmit in the gap symbol when the CAPC value associated with the second PSSCH communication does not satisfy a threshold. The threshold may include a single CAPC value and/or a range of CAPC values. For example, in some instances the threshold is satisfied when the CAPC value associated with the second PSSCH communication is lesser than the single CAPC value, less than or equal to the single CAPC value, and/or included in the range of CAPC values. In some instances, the threshold is not satisfied when the CAPC value associated with the second PSSCH communication is greater than the single CAPC value, greater than or equal to the single CAPC value, and/or not included in the range of CAPC values.

The second sidelink UE may receive the threshold value (s) and/or the CAPC value associated with the second PSSCH communication from the BS (e.g., the BS 105 or 800) via a PDCCH, a PDSCH, DCI, an RRC message, a MAC-CE message, or other suitable communication. In some aspects, the second sidelink UE may receive the threshold and/or the CAPC value associated with the second PSSCH communication from the BS via downlink control information (DCI) (e.g., a DCI-3.0 message). Additionally or alternatively, the second sidelink UE may determine the CAPC of the second PSSCH communication based on a priority level associated with a TB to be transmitted in the second PSSCH communication.

At action 1020, the method 1000 includes a first sidelink UE (e.g., the UE 115 or the UE 700) receiving a first physical sidelink shared channel (PSSCH) communication from a second sidelink UE via the channel-access gap symbol based on the indicator associated with the occupancy of the channel-access gap symbol. By utilizing the channel-access gap symbol to transmit the first PSSCH communication, the second sidelink UE may increase the communications capacity of the wireless network (e.g., the wireless network 100, 200, or 201) and/or increase the communications capacity between the first and second sidelink UEs. In some aspects, the first PSSCH communication and/or the second PSSCH communication may carry one or more transport blocks (TBs).

In some aspects, the second sidelink UE may transmit the indicator associated with occupancy of the channel-access gap symbol to the first sidelink UE. The indicator may be the same indicator received by the second sidelink UE from the BS (e.g., a code point) or the indicator may be different from the indicator received by the second sidelink UE from the BS. For example, the indicator may be a TDRA transmitted via SCI to the first sidelink UE indicating resources in the gap symbol for the second sidelink UE to transmit a PSSCH communication. The second sidelink UE may transmit the indicator to the first sidelink UE as a code point via SCI (e.g., SCI-1 and/or SCI-2). The code point may be a single bit (e.g., 0 or 1) indicating whether the second sidelink UE may occupy (e.g., transmit in) the gap symbol. For example, the second sidelink UE may transmit a code point "1" in SCI to indicate the second sidelink UE may transmit to the first sidelink UE in the gap symbol or a code point "0" in SCI to indicate the second sidelink UE may not transmit to the first sidelink UE in the gap symbol. In some aspects, the second sidelink UE may transmit an indicator to the first sidelink UE indicating whether the second sidelink UE may occupy (e.g., transmit in) the gap symbol of a plurality of slots and/or a sequence (e.g., contiguous sequence) of slots. In this regard, the second sidelink UE may transmit an indicator indicating the number of slots the second sidelink UE may occupy the gap symbol and/or the indexes associated with the slots in which the second sidelink UE may occupy the gap symbol.

In some aspects, the second sidelink UE may transmit a second PSSCH communication to the first sidelink UE in a slot contiguous with the channel-access gap symbol based on the indicator associated with the occupancy of the channel-access gap symbol. In this regard, the second sidelink UE may transmit the first PSSCH in the gap symbol (e.g., symbol index 13) of a first slot and transmit the second PSSCH in a second slot that is contiguous with the gap symbol of the first slot.

In some aspects, the second sidelink UE may receive an indicator from the BS indicating time resources and/or frequency resources for transmitting the first PSSCH in the gap symbol and/or transmitting the second PSSCH in a slot contiguous with the gap symbol (e.g., a slot before the gap symbol and/or a slot after the gap symbol). The second sidelink UE may receive a time domain resources allocation (TDRA) and/or a frequency domain resources allocation (FDRA) from the BS. In this regard, the second sidelink UE may receive the TDRA/FDRA from the BS via DCI (e.g., a DCI-3.0 message) or other suitable communication.

In some aspects, the second sidelink UE may transmit an indicator to the first sidelink UE indicating the TDRA/FDRA for transmitting the first PSSCH in the gap symbol and/or transmitting the second PSSCH in a slot contiguous with the gap symbol. The second sidelink UE may transmit the TDRA and/or the FDRA to the first sidelink UE via SCI (e.g., SCI-1 and/or SCI-2). The second sidelink UE may transmit the TDRA and/or the FDRA to the first sidelink UE in the same or different SCI as the indicator associated with occupancy of the channel-access gap symbol.

In some aspects, when the second sidelink UE transmits a first PSSCH communication to the first sidelink UE in the gap symbol and a second PSSCH communication in a slot contiguous with the gap symbol, the second sidelink UE may transmit the first and second PSSCHs in the same frequency band(s) (e.g., same frequency subchannel(s)). The second sidelink UE may indicate the frequency band(s) for the first and second PSSCH transmissions to the first sidelink UE. In some instances, the second sidelink UE may indicate the frequency band(s) for the first and second PSSCH transmissions to the first sidelink in the FDRA via SCI.

In some aspects, when the second sidelink UE transmits a first PSSCH communication to the first sidelink UE in the gap symbol and a second PSSCH communication in a slot contiguous with the gap symbol, the second sidelink UE may transmit the first and second PSSCHs in different frequency band(s) (e.g., different frequency subchannel(s)). For example, the second sidelink UE may transmit the first PSSCH communication in the gap symbol of a slot associated with a first frequency and transmit the second PSSCH communication in a slot associated with a second frequency. In some aspects, the second sidelink UE may transmit the first PSSCH communication in the gap symbol of a slot associated with a first frequency interlace and transmit the second PSSCH communication in a contiguous slot associated with a second frequency interlace. The first frequency interlace may be the same or different from the second frequency interlace. For instance, the BS may transmit a configuration to the second sidelink UE indicating a first frequency interlace for a slot that includes the gap symbol carrying the first PSSCH and a second frequency interlace for a slot contiguous with the slot that includes the gap symbol. The second PSSCH communication may be transmitted using the second frequency interlace. In this regard, the first and second frequency interlaces may be indicated by the FDRA. The first and second PSSCH communications may be frequency interlaced over a frequency band (e.g., a 20 MHz frequency band, a 40 MHz frequency band, an 80 MHz frequency band, a 160 MHz frequency band, a licensed frequency band, an unlicensed frequency band, etc.).

The first and second frequency interlaces may include a plurality of frequency interlaces over a 20 MHz band or other suitable band, where each frequency interlace may include a plurality of resource blocks (RBs) distributed over the frequency band. The first and second frequency interlaces may include every second, third, fourth, or other increment of subchannels over the unlicensed frequency band. In some aspects, the first PSSCH may be transmitted in one or more gap symbols of the first frequency interlace while the second PSSCH is transmitted over a single frequency band (e.g., a non-interlaced frequency band).

In some aspects, the second sidelink UE may receive a grant (e.g., a configured grant, a dynamic grant) from a BS for time/frequency resources for transmitting one or more PSSCH communications in one or more gap symbols associated with one or more slots (e.g., contiguous slots). The time/frequency resources may be intra-grant resources. In this regard, the time/frequency resources for transmitting one or more PSSCHs may be received by the second sidelink UE from the BS in a single grant (e.g., a single configured grant, a single dynamic grant) via a single DCI message (e.g., a single DCI 3-0 message) or other suitable communication. The single grant may be associated with a semi-static configuration of a resource pool. In some aspects, the time/frequency resources in the grant may be dedicated to the second sidelink UE.

In some aspects, the message including the grant may also include one or more code points indicating whether the second sidelink UE may occupy (e.g., transmit in) the gap symbol of each of the slots associated with the intra-grant time/frequency resources. In this regard, a single code point may indicate whether the second sidelink UE may transmit in the gap symbol in all the slots of the intra-grant resources. Additionally or alternatively, different code points may individually indicate whether the second sidelink UE may transmit in the gap symbol in each of the slots of the intra-grant resources and/or a group of slots of the intra-grant resources.

In some aspects, the second sidelink UE may receive multiple grants (e.g., multiple configured grants, multiple dynamic grants, or a combination of configured and dynamic grants) from a BS for time/frequency resources for transmitting one or more PSSCH communications in one or more gap symbols associated with one or more slots (e.g., contiguous slots). The time/frequency resources may be inter-grant resources. In this regard, the time/frequency resources for transmitting the first may be received by the second sidelink UE from the BS in a first grant (e.g., a first configured grant, a first dynamic grant) via a first DCI message (e.g., a DCI 3-0 message) or other suitable communication, while the time/frequency resources for transmitting the second PSSCH may be received in a second grant (e.g., a second configured grant, a second dynamic grant) via a second DCI message or other suitable communication. The first and second grants may be associated with a semi-static configuration of a resource pool. In some aspects, the time/frequency resources in the first grant and/or the second grant may be dedicated to the second sidelink UE.

In some aspects, each of the first and second messages including the grants may also include one or more code points indicating whether the second sidelink UE may occupy (e.g., transmit in) the gap symbol of each of the slots associated with the inter-grant time/frequency resources. In this regard, a single code point in the first DCI message may indicate whether the second sidelink UE may transmit in the gap symbol in all the slots of the first grant. A single code point in the second DCI message may indicate whether the second sidelink UE may transmit in the gap symbol in all the slots of the second grant. Additionally or alternatively, different code points in the first DCI message and the second DCI message may individually indicate whether the second sidelink UE may transmit in the gap symbol in each of the slots of the inter-grant resources.

In some aspects, the second sidelink UE may transmit the first PSSCH communication via the entire gap symbol. Additionally or alternatively, the second sidelink UE may transmit the first PSSCH communication via a first portion of the gap symbol and refrain from transmitting the first PSSCH communication during a second portion of the gap symbol. In this regard, the second sidelink UE may use a cyclic prefix (CP) extension to create the second portion (e.g., a gap duration) of the gap symbol. The second portion may be about 16 µs to about 25 µs. The second portion may be contiguous with the first symbol of an adjacent (e.g., contiguous) slot. The second portion of the gap symbol in which the second sidelink UE is not transmitting may be used by other UE(s). For example, other UE(s) may perform radio resource management (RRM) measurements during the second portion of the gap symbol. In some aspects, other UE(s) may perform an LBT (e.g., type 2 LBT) during the second portion to facilitate channel occupancy time (COT) sharing among other UE(s). The second sidelink UE may receive an indicator from a BS (e.g., the BS 105 or 800) indicating the second sidelink UE should transmit the first PSSCH communication via a first portion of the gap symbol and refrain from transmitting during the second portion. The second sidelink UE may receive the indicator from the BS via DCI (e.g., DCI 3-0), a PDCCH, a PDSCH, an RRC message, a MAC-CE message, or other suitable communication.

In some aspects, the second sidelink UE may receive an indicator from a BS indicating whether the second sidelink UE should perform an LBT before transmitting the second PSSCH communication. In this regard, the second sidelink UE may receive the indicator from the BS via DCI (e.g., DCI 3-0), a PDCCH, a PDSCH, an RRC message, a MAC-CE message, or other suitable communication. The second sidelink UE may perform the LBT in the second portion of the gap symbol (e.g., a CP extension duration). For example, the second sidelink UE may select a CP extension duration of about 16 µs, about 25 µs, or other suitable duration for a CAT2 LBT to be performed prior to the second PSSCH communication. The gap symbol duration may vary depending on an SCS and/or a number of subcarriers in a symbol. Thus, the CP extension duration may be dependent on the SCS and/or the number of subcarriers in a symbol. The second sidelink UE may transmit the second PSSCH communication in a slot contiguous with the second portion of the gap symbol based on a successful LBT. The second sidelink UE may refrain from transmitting the second PSSCH communication based on an unsuccessful LBT.

In some aspects, the second sidelink UE select from a first option including transmitting a first PSSCH communication in a first portion of the gap symbol and performing an LBT in the second portion of the gap symbol or a second option including rate matching the first PSSCH communication around the gap symbol. The second sidelink UE may select the first option or the second option based on, without limitation, a CAPC associated with the first PSSCH communication, a CAPC associated with the second PSSCH communication, a latency budget associated with the first PSSCH communication, a latency budget associated with the second PSSCH communication, a type of the first sidelink UE, a type of the second sidelink UE, scheduled transmissions associated with the first sidelink UE, scheduled transmissions associated with the second sidelink UE, and/or scheduled transmissions associated with a third sidelink UE in proximity to the first sidelink UE or the second sidelink UE. The second sidelink UE may transmit an indicator indicating the selected option to the first sidelink UE via SCI (e.g., (SCI-1, SCI-2). In some instances, the second sidelink UE may receive an indicator from a BS indicating which option (e.g., the first option or the second option) that the second sidelink UE should select. In this regard, the second sidelink UE may receive the option indicator semi-statically from the BS via an RRC message or other suitable communication. Additionally or alternatively, the second sidelink UE may receive the option indicator semi-statically from the BS via DCI (e.g., DCI 3-0) or other suitable communication. For example, the second sidelink UE may receive the option indicator semi-statically from the BS using code points transmitted via DCI (e.g., DCI 3-0) or other suitable communication.

The semi-static indicator may be transmitted by the BS on a resource pool basis, a configured grant basis, or based on a type of the second sidelink UE (e.g., an IOT UE, a vehicle, a smartphone). For example, in some instances the second sidelink UE may receive an allocation to a first resource pool. The semi-static indicator may indicate the second sidelink UE shall perform an LBT in the second portion of the gap symbol for the first resource pool. When the second sidelink UE receives an allocation to a second resource pool, the semi-static indicator may indicate the second sidelink UE shall not perform an LBT in the second portion of the gap symbol before transmitting the second PSSCH. In some instances, the second sidelink UE may receive a first configured grant. The semi-static indicator may indicate the second sidelink UE shall perform an LBT in the second portion of the gap symbol for slots associated with the first configured grant. When the second sidelink UE receives a second configured grant, the semi-static indicator may indicate the second sidelink UE shall not perform an LBT in the second portion of the gap symbol before transmitting the second PSSCH. Further, in some instances a semi-static indicator associated with one or more classes of UEs (e.g., based on device type and/or priority level(s)) may indicate that the UEs in the associated class(es) shall perform an LBT in the second portion of the gap symbol, while a semi-static indicator associated with one or more other classes of UEs may indicate that the UEs in the associated class(es) shall not perform an LBT in the second portion of the gap symbol before transmitting the second PSSCH.

In some aspects, the second sidelink UE may indicate to the first sidelink UE (e.g., via TDRA/FDRA in SCI) that the second sidelink UE intends to transmit a first PSSCH to the first sidelink UE in the gap symbol. However, the first sidelink UE may intend to use the gap symbol for switching its transceiver from a receive mode to a transmit mode during the gap symbol in order for the first sidelink UE to transmit a communication (e.g., a high priority and/or low latency PSSCH communication) to a third sidelink UE or other device (e.g., the BS). In this case, the first sidelink UE may indicate (e.g., via a PC5-RRC message or other suitable communication) to the second sidelink UE that the first sidelink UE will refrain from switching its transceiver from receive to transmit mode during the gap symbol in order to receive the first PSSCH in the gap symbol. In some aspects, the first sidelink UE may indicate (e.g., via a PC5-RRC message or other suitable communication) to the second sidelink UE that the first sidelink UE will switch to a transmit mode during the gap symbol. In this case, the second sidelink UE may refrain from transmitting during the gap symbol to allow the first sidelink UE to transmit to the third sidelink UE. Additionally or alternatively, the BS may indicate to the second sidelink UE which slots the second sidelink UE may transmit during the gap symbol. The BS may be aware of the transmissions scheduled by the first sidelink UE and other sidelink UEs. The BS may not allow the second sidelink UE to transmit in gap symbols of slots that the first sidelink UE and/or other sidelink UEs may need to switch transmit/receive modes. In this regard, the second sidelink UE may transmit to the BS a list indicating the first sidelink UE and other sidelink UEs that the second sidelink UE intends to transmit to in the gap symbol. In this way, the BS may coordinate which slots the second sidelink UE may transmit PSSCHs in.

In some aspects, the second sidelink UE may transmit a first PSSCH communication in a slot that includes a physical sidelink feedback channel (PSFCH). The slot that includes a PSFCH may include multiple gap symbols. In this case, the second sidelink UE may receive an indicator from the BS indicating whether the second sidelink UE may transmit a first PSSCH communication in one or more of the multiple gap symbols. For example, the second sidelink UE may receive the indicator from the BS using code points and/or a bitmap indicating which of the gap symbols the second sidelink UE may transmit in. In this regard, the second sidelink UE may receive the indicator from the BS via DCI (e.g., DCI 3-0), a PDCCH, a PDSCH, an RRC message, a MAC-CE message, or other suitable communication. For example, the second sidelink UE may transmit the first PSSCH communication in gap symbol index (10) based on the indicator (e.g., code points and/or a bitmap indicating which of the gap symbols the second sidelink UE may transmit in), transmit a PSFCH communication in symbol indexes (11) and (12), continue the transmission of the first PSSCH communication in gap symbol index (13) based on the indicator, and transmit a second PSSCH communication in a slot contiguous with gap symbol index (13).

In some aspects, the second sidelink UE may transmit a first PSSCH communication in a slot that includes a scheduled PSFCH. However, the second sidelink UE may not have any HARQ feedback to transmit in the slot via the PSFCH. In this case, the second sidelink UE may transmit the first PSSCH communication in the symbols that include the scheduled PSFCH (e.g., symbol indexes 11 and 12). In some aspects, the second sidelink UE may transmit PSSCH communications in scheduled PSFCH symbols in each of the slots in which the second sidelink UE does not have HARQ feedback to transmit. The BS may determine whether the second sidelink UE may transmit the first PSSCH communication in the symbols that include the scheduled PSFCH based on whether the second sidelink UE has received one or more PSSCH communications that require the second sidelink UE to transmit HARQ feedback.

In some aspects, the second sidelink UE may transmit a first PSSCH communication in a gap symbol and a second PSSCH communication in a slot contiguous with the gap symbol. The slot contiguous with the gap symbol may include an automatic gain control (AGC) symbol. The AGC symbol may be located in symbol index (0) (e.g., the leading symbol of the slot). The second sidelink UE may receive an indicator from the BS associated with occupancy of the AGC symbol in the slot contiguous with the gap symbol. The indicator may indicate whether the second sidelink UE may transmit the second PSSCH communication in the AGC symbol of the slot contiguous with the gap symbol. In this regard, the second sidelink UE may receive the indicator from the BS via DCI (e.g., DCI 3-0), a PDCCH, a PDSCH, an RRC message, a MAC-CE message, or other suitable communication. In some instances, the AGC symbol of the slot contiguous with the gap symbol may be used by the first sidelink receiving the first and second PSSCH communications to calibrate the gain of its receiver. In this regard, the first sidelink UE may use the AGC symbol of the slot that carries the first PSSCH communication to calibrate its receiver and may not require the AGC symbol of the slot contiguous with the gap symbol for receiver calibration. The AGC symbol of the slot contiguous with the gap symbol may carry the second PSSCH.

Further aspects of the present disclosure include the following:

Aspect 1 includes a method of wireless communication performed by a first sidelink user equipment (UE), the method comprising receiving, from a base station (BS), an indicator associated with occupancy of a channel-access gap symbol; and transmitting, to a second sidelink UE, a first physical sidelink shared channel (PSSCH) communication via the channel-access gap symbol based on the indicator associated with the occupancy of the channel-access gap symbol.

Aspect 2 includes the method of aspect 1, wherein the receiving the indicator associated with the occupancy of the channel-access gap symbol comprises receiving the indicator as a code point via downlink control information (DCI).

Aspect 3 includes the method of any of aspects 1-2, further comprising transmitting, to the second sidelink UE via sidelink control information (SCI), the indicator associated with the occupancy of the channel-access gap symbol.

Aspect 4 includes the method of any of aspects 1-3, further comprising transmitting, to the second sidelink UE, a second PSSCH communication in a slot contiguous with the channel-access gap symbol based on the indicator associated with the occupancy of the channel-access gap symbol.

Aspect 5 includes the method of any of aspects 1-4, wherein the transmitting the first PSSCH communication comprises transmitting the first PSSCH communication in a first frequency interlace; and the transmitting the second PSSCH communication comprises transmitting the second PSSCH communication in a second frequency interlace, wherein the second frequency interlace is different from the first frequency interlace.

Aspect 6 includes the method of any of aspects 1-5, further comprising receiving, from the BS, a grant indicating resources; and transmitting, to the second sidelink UE based on the indicated resources, a second PSSCH communication in a slot contiguous with the channel-access gap symbol; and wherein the transmitting the first PSSCH communication comprises transmitting the first PSSCH communication based on the indicated resources.

Aspect 7 includes the method of any of aspects 1-6, further comprising receiving, from the BS, a first grant indicating first resources, wherein the transmitting the first PSSCH communication comprises transmitting the first PSSCH communication based on the first resources; receiving, from the BS, a second grant indicating second resources, wherein the second resources are different from the first resources; and transmitting, to the second sidelink UE based on the second resources, a second PSSCH communication in a slot contiguous with the channel-access gap symbol.

Aspect 8 includes the method of any of aspects 1-7, wherein the indicator associated with the occupancy of the channel-access gap symbol is based on a channel access priority class (CAPC) associated with a second PSSCH communication.

Aspect 9 includes the method of any of aspects 1-8, wherein the transmitting the first PSSCH communication via the channel-access gap symbol comprises transmitting the first PSSCH communication via a first portion of the channel-access gap symbol; and further comprising refraining from transmitting the first PSSCH communication during a second portion of the channel-access gap symbol.

Aspect 10 includes the method of any of aspects 1-9, further comprising performing a listen-before-talk (LBT) procedure before a slot contiguous with the channel-access gap symbol; and transmitting, to the second sidelink UE based on a successful LBT procedure, a second PSSCH in the slot contiguous with the channel-access gap symbol.

Aspect 11 includes the method of any of aspects 1-10, further comprising receiving, from the BS, an indicator associated with occupancy of an automatic gain control (AGC) symbol contiguous with the channel-access gap symbol; and transmitting, to the second sidelink UE, a second PSSCH communication via the AGC symbol based on the indicator associated with the occupancy of the AGC symbol.

Aspect 12 includes a method of wireless communication performed by a first sidelink user equipment (UE), the method comprising receiving, from a second sidelink UE, an indicator associated with occupancy of a channel-access gap symbol; and receiving, from the second sidelink UE, a first physical sidelink shared channel (PSSCH) communication via the channel-access gap symbol based on the indicator associated with the occupancy of the channel-access gap symbol.

Aspect 13 includes the method of aspect 12, further comprising receiving, from the second sidelink UE, a second PSSCH communication in a slot contiguous with the channel-access gap symbol.

Aspect 14 includes the method of any of aspects 12-13, wherein the receiving the first PSSCH communication comprises receiving the first PSSCH communication in a first frequency interlace; and the receiving the second PSSCH communication comprises receiving the second PSSCH communication in a second frequency interlace, wherein the second frequency interlace is different from the first frequency interlace.

Aspect 15 includes the method of any of aspects 12-14, further comprising receiving, from the second sidelink UE, an indicator associated with occupancy of an automatic gain control (AGC) symbol contiguous with the channel-access gap symbol; and receiving, from the second sidelink UE, a second PSSCH communication via the AGC symbol based on the indicator associated with the occupancy of the AGC symbol.

Aspect 16 includes a non-transitory computer-readable medium storing one or more instructions for wireless communication, the one or more instructions comprising one or more instructions that, when executed by one or more processors of a first sidelink user equipment (UE), cause the one or more processors to perform any one of aspects 1-11.

Aspect 17 includes a non-transitory computer-readable medium storing one or more instructions for wireless communication, the one or more instructions comprising one or more instructions that, when executed by one or more processors of a first sidelink user equipment (UE), cause the one or more processors to perform any one of aspects 12-15.

Aspect 18 includes a first sidelink user equipment (UE) comprising one or more means to perform any one or more of aspects 1-11.

Aspect 19 includes a first sidelink user equipment (UE) comprising one or more means to perform any one or more of aspects 12-15.

Aspect 20 includes a first sidelink user equipment (UE) comprising a memory, a transceiver and at least one processor coupled to the memory and the transceiver, wherein the first sidelink UE is configured to perform any one or more of aspects 1-11.

Aspect 21 includes a first sidelink user equipment (UE) comprising a memory, a transceiver and at least one processor coupled to the memory and the transceiver, wherein the first sidelink UE is configured to perform any one or more of aspects 12-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
  receiving, from a base station (BS), an indicator associated with occupancy of a channel-access gap symbol, wherein the channel-access gap symbol comprises a time period reserved to facilitate transmit/receive switching, wherein the channel-access gap symbol includes a first portion and a second portion; and
  transmitting, to a second sidelink UE, a first physical sidelink shared channel (PSSCH) communication during the first portion of the channel-access gap symbol based on the indicator and not during the second portion.

2. The method of claim 1, wherein the receiving the indicator associated with the occupancy of the channel-access gap symbol comprises receiving the indicator as a code point via downlink control information (DCI).

3. The method of claim 1, further comprising:
  transmitting, to the second sidelink UE via sidelink control information (SCI), the indicator associated with the occupancy of the channel-access gap symbol.

4. The method of claim 1, further comprising:
  transmitting, to the second sidelink UE, a second PSSCH communication in a slot contiguous with the channel-access gap symbol based on the indicator associated with the occupancy of the channel-access gap symbol.

5. The method of claim 4, wherein:
  the transmitting the first PSSCH communication comprises transmitting the first PSSCH communication in a first frequency interlace; and
  the transmitting the second PSSCH communication comprises transmitting the second PSSCH communication in a second frequency interlace, wherein the second frequency interlace is different from the first frequency interlace.

6. The method of claim 1, further comprising:
  receiving, from the BS, a grant indicating resources; and
  transmitting, to the second sidelink UE based on the indicated resources, a second PSSCH communication in a slot contiguous with the channel-access gap symbol; and
  wherein the transmitting the first PSSCH communication comprises transmitting the first PSSCH communication based on the indicated resources.

7. The method of claim 1, further comprising:
  receiving, from the BS, a first grant indicating first resources, wherein the transmitting the first PSSCH communication comprises transmitting the first PSSCH communication based on the first resources;
  receiving, from the BS, a second grant indicating second resources, wherein the second resources are different from the first resources; and
  transmitting, to the second sidelink UE based on the second resources, a second PSSCH communication in a slot contiguous with the channel-access gap symbol.

8. The method of claim 1, wherein the indicator associated with the occupancy of the channel-access gap symbol is based on a channel access priority class (CAPC) associated with a second PSSCH communication.

9. The method of claim 1, further comprising:
  performing a listen-before-talk (LBT) procedure before a slot contiguous with the channel-access gap symbol; and
  transmitting, to the second sidelink UE based on a successful LBT procedure, a second PSSCH in the slot contiguous with the channel-access gap symbol.

10. The method of claim 1, further comprising:
  receiving, from the BS, an indicator associated with occupancy of an automatic gain control (AGC) symbol contiguous with the channel-access gap symbol; and
  transmitting, to the second sidelink UE, a second PSSCH communication via the AGC symbol based on the indicator associated with the occupancy of the AGC symbol.

11. A method of wireless communication performed by a first sidelink user equipment (UE), the method comprising:
  receiving, from a second sidelink UE, an indicator associated with occupancy of a channel-access gap symbol, wherein the channel-access gap symbol comprises a time period reserved to facilitate transmit/receive switching, wherein the channel-access gap symbol includes a first portion and a second portion; and
  receiving, from the second sidelink UE, a first physical sidelink shared channel (PSSCH) communication during the first portion of the channel-access gap symbol based on the indicator and not during the second portion.

12. The method of claim 11, further comprising:
  receiving, from the second sidelink UE, a second PSSCH communication in a slot contiguous with the channel-access gap symbol.

13. The method of claim 12, wherein:
  the receiving the first PSSCH communication comprises receiving the first PSSCH communication in a first frequency interlace; and
  the receiving the second PSSCH communication comprises receiving the second PSSCH communication in a second frequency interlace, wherein the second frequency interlace is different from the first frequency interlace.

14. The method of claim 11, further comprising:
  receiving, from the second sidelink UE, an indicator associated with occupancy of an automatic gain control (AGC) symbol contiguous with the channel-access gap symbol; and
  receiving, from the second sidelink UE, a second PSSCH communication via the AGC symbol based on the indicator associated with the occupancy of the AGC symbol.

15. A first sidelink user equipment (UE) comprising:
  a memory;
  a transceiver; and
  at least one processor coupled to the memory and the transceiver, wherein the first sidelink UE is configured to:
    receive, from a base station (BS), an indicator associated with occupancy of a channel-access gap symbol, wherein the channel-access gap symbol comprises a time period reserved to facilitate transmit/receive switching, wherein the channel-access gap symbol includes a first portion and a second portion; and
    transmit, to a second sidelink UE, a first physical sidelink shared channel (PSSCH) communication during the first portion of the channel-access gap symbol based on the indicator associated with the occupancy of the channel-access gap symbol and not during the second portion.

16. The first sidelink UE of claim 15, wherein the first sidelink UE is further configured to:
  receive the indicator associated with the occupancy of the channel-access gap symbol as a code point via downlink control information (DCI).

17. The first sidelink UE of claim 15, wherein the first sidelink UE is further configured to:
transmit, to the second sidelink UE via sidelink control information (SCI), the indicator associated with the occupancy of the channel-access gap symbol.

18. The first sidelink UE of claim 15, wherein the first sidelink UE is further configured to:
transmit, to the second sidelink UE, a second PSSCH communication in a slot contiguous with the channel-access gap symbol based on the indicator associated with the occupancy of the channel-access gap symbol.

19. The first sidelink UE of claim 18, wherein the first sidelink UE is further configured to:
transmit the first PSSCH communication in a first frequency interlace; and
transmit the second PSSCH communication in a second frequency interlace, wherein the second frequency interlace is different from the first frequency interlace.

20. The first sidelink UE of claim 15, wherein the first sidelink UE is further configured to:
receive, from the BS, a grant indicating resources;
transmit, to the second sidelink UE based on the indicated resources, a second PSSCH communication in a slot contiguous with the channel-access gap symbol; and
transmit the first PSSCH communication based on the indicated resources.

21. The first sidelink UE of claim 15, wherein the first sidelink UE is further configured to:
receive, from the BS, a first grant indicating first resources;
transmit the first PSSCH communication based on the first resources;
receive, from the BS, a second grant indicating second resources, wherein the second resources are different from the first resources; and
transmit, to the second sidelink UE based on the second resources, a second PSSCH communication in a slot contiguous with the channel-access gap symbol.

22. The first sidelink UE of claim 15, wherein the indicator associated with the occupancy of the channel-access gap symbol is based on a channel access priority class (CAPC) associated with a second PSSCH communication.

23. The first sidelink UE of claim 15, wherein the first sidelink UE is further configured to:
perform a listen-before-talk (LBT) procedure before a slot contiguous with the channel-access gap symbol; and
transmit, to the second sidelink UE based on a successful LBT procedure, a second PSSCH in the slot contiguous with the channel-access gap symbol.

24. The first sidelink UE of claim 15, wherein the first sidelink UE is further configured to:
receive, from the BS, an indicator associated with occupancy of an automatic gain control (AGC) symbol contiguous with the channel-access gap symbol; and
transmit, to the second sidelink UE, a second PSSCH communication via the AGC symbol based on the indicator associated with the occupancy of the AGC symbol.

25. A first sidelink user equipment (UE) comprising:
a memory;
a transceiver; and
at least one processor coupled to the memory and the transceiver, wherein the first sidelink UE is configured to:
receive, from a second sidelink UE, an indicator associated with occupancy of a channel-access gap symbol, wherein the channel-access gap symbol comprises a time period reserved to facilitate transmit/receive switching, wherein the channel-access gap symbol includes a first portion and a second portion; and
receive, from the second sidelink UE, a first physical sidelink shared channel (PSSCH) communication during the first portion of the channel-access gap symbol based on the indicator associated with the occupancy of the channel-access gap symbol and not during the second portion.

26. The first sidelink UE of claim 25, wherein the first sidelink UE is further configured to:
receive, from the second sidelink UE, a second PSSCH communication in a slot contiguous with the channel-access gap symbol.

27. The first sidelink UE of claim 26, wherein the first sidelink UE is further configured to:
receive the first PSSCH communication in a first frequency interlace; and
receive the second PSSCH communication in a second frequency interlace, wherein the second frequency interlace is different from the first frequency interlace.

28. The first sidelink UE of claim 25, wherein the first sidelink UE is further configured to:
receive, from the second sidelink UE, an indicator associated with occupancy of an automatic gain control (AGC) symbol contiguous with the channel-access gap symbol; and
receive, from the second sidelink UE, a second PSSCH communication via the AGC symbol based on the indicator associated with the occupancy of the AGC symbol.

* * * * *